US012073596B2

(12) United States Patent
Nakagami et al.

(10) Patent No.: US 12,073,596 B2
(45) Date of Patent: Aug. 27, 2024

(54) INFORMATION PROCESSING APPARATUS AND METHOD

(71) Applicant: SONY GROUP CORPORATION, Tokyo (JP)

(72) Inventors: Ohji Nakagami, Tokyo (JP); Koji Yano, Tokyo (JP); Satoru Kuma, Tokyo (JP); Hiroyuki Yasuda, Saitama (JP); Tsuyoshi Kato, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 405 days.

(21) Appl. No.: 17/625,940

(22) PCT Filed: Jul. 6, 2020

(86) PCT No.: PCT/JP2020/026322
§ 371 (c)(1),
(2) Date: Jan. 10, 2022

(87) PCT Pub. No.: WO2021/010200
PCT Pub. Date: Jan. 21, 2021

(65) Prior Publication Data
US 2022/0262043 A1 Aug. 18, 2022

(30) Foreign Application Priority Data

Jul. 17, 2019 (JP) ................... 2019-131952

(51) Int. Cl.
*G06T 9/40* (2006.01)
(52) U.S. Cl.
CPC ..................... *G06T 9/40* (2013.01)
(58) Field of Classification Search
None
See application file for complete search history.

(56) References Cited

U.S. PATENT DOCUMENTS 11,122,102 B2 * 9/2021 Oh ...................... G06T 17/10
11,252,441 B2 * 2/2022 Tourapis ................ H04N 19/13
(Continued)

FOREIGN PATENT DOCUMENTS

| WO | WO 2018/016168 A1 | 1/2018 |
| WO | WO 2019/069711 A1 | 4/2019 |
| WO | WO-2019082837 A1 | 5/2019 |

OTHER PUBLICATIONS

Mammou et al., Lifting Scheme for Lossy Attribute Encoding in TMC1, International Organisation for Standardisation ISO/IEC JTC1/SC29/WG11 Coding of Moving Pictures and Audio, Apr. 2018, pp. 1-9, San Diego, US.
Nakagami et al., [G-PCC] Spatial scalability support for G-PCC, International Organisation for Standardisation ISO/IEC JTC1/SC29/WG11 Coding of Moving Pictures and Audio, Mar. 2019, pp. 1-15, Geneva, CH.

(Continued)

*Primary Examiner* — Anand P Bhatnagar
(74) *Attorney, Agent, or Firm* — Paratus Law Group, PLLC

(57) ABSTRACT

There is provided an information processing apparatus and method which enable an increase in a load of decoding processing of coded data of a point cloud to be suppressed. Positional information of a point cloud expressing an object with a three-dimensional shape as a set of points is encoded in an order which causes a decoding result of coded data of the positional information to be output in a processing order of attribute information of the point cloud, and coded data thereof is generated. In addition, coded data of positional information of a point cloud expressing an object with a three-dimensional shape as a set of points is decoded and a decoding result thereof is to be output in a processing order of attribute information of the point cloud. For example, the present disclosure can be applied to an information processing apparatus, an image processing apparatus, a coding apparatus, a decoding apparatus, an electronic device, an information processing method, a program, or the like.

20 Claims, 15 Drawing Sheets

(56) References Cited

U.S. PATENT DOCUMENTS

| | | | |
|---|---|---|---|
| 11,461,935 B2* | 10/2022 | Mammou | H04N 19/45 |
| 11,508,095 B2* | 11/2022 | Mammou | G06T 9/001 |
| 11,552,651 B2* | 1/2023 | Mammou | H04N 19/436 |
| 11,727,603 B2* | 8/2023 | Mammou | G06T 9/00 |
| | | | 382/233 |
| 11,935,272 B2* | 3/2024 | Mammou | H04N 19/96 |
| 2019/0080483 A1 | 3/2019 | Mammou et al. | |
| 2022/0028120 A1* | 1/2022 | Sugio | G06T 9/001 |
| 2022/0159310 A1* | 5/2022 | Oh | H04N 19/124 |
| 2022/0159312 A1* | 5/2022 | Oh | G06T 9/004 |
| 2022/0239945 A1* | 7/2022 | Oh | H04N 19/30 |
| 2022/0360797 A1* | 11/2022 | Oh | H04N 19/70 |

OTHER PUBLICATIONS

Mekuria et al., Design, Implementation and Evaluation of a Point Cloud Codec for Tele-Immersive Video, IEEE Transactions on Circuits and Systems for Video Technology, Mar. 16, 2016, pp. 1-14.

Sugio, [G-PCC] Reference structure modification on attribute predicting transform in TMC13, International Organisation for Standardisation ISO/IEC JTC1/SC29/WG11 Coding of Moving Pictures and Audio, Jan. 2019, pp. 1-4, Marrakech, MA.

"G-PCC codec description v3", 126. MPEG Meeting; Mar. 25, 2019-Mar. 29, 2019; Geneva; (Motion Picture Expert Group or ISO/IEC JTC 1/SC29/WG 11), No. n18486 Jul. 4, 2019 (Jul. 4, 2019), XP030222354 [retrieved on Jul. 4, 2019].

* cited by examiner

Fig. 2

| METHOD 1 | SET OUTPUT ORDER OF DECODING RESULT OF POSITIONAL INFORMATION TO PREDETERMINED ORDER |
|---|---|
| METHOD 1-1 | SET PREDETERMINED ORDER TO MORTON ORDER |
| METHOD 1-2 | SET PREDETERMINED ORDER TO PROCESSING ORDER OF ATTRIBUTE DATA |
| METHOD 1-3 | GUARANTEE OUTPUT ORDER IN EACH NODE OF TREE STRUCTURE |
| METHOD 1-4 | SIGNAL CONTROL INFORMATION RELATED TO POINT OF DCM |
| METHOD 1-5 | GENERATE CONTROL INFORMATION FOR EACH LEVEL OF TREE STRUCTURE |
| METHOD 1-6 | TRANSMIT CONTROL INFORMATION BY PREDETERMINED TRANSMISSION METHOD |

INFORMATION PROCESSING APPARATUS AND METHOD

CROSS REFERENCE TO PRIOR APPLICATION

This application is a National Stage Patent Application of PCT International Patent Application No. PCT/JP2020/026322 (filed on Jul. 6, 2020) under 35 U.S.C. § 371, which claims priority to Japanese Patent Application No. 2019-131952 (filed on Jul. 17, 2019), which are all hereby incorporated by reference in their entirety.

TECHNICAL FIELD

The present disclosure relates to an information processing apparatus and method and, particularly, to an information processing apparatus and method which enable an increase in a load of decoding processing of coded data of a point cloud to be suppressed.

BACKGROUND ART

Conventionally, coding methods of 3D data representing a three-dimensional structure such as a point cloud have been devised (for example, refer to NPL 1). Data of a point cloud is constituted of geometry data (also referred to as positional information) and attribute data (also referred to as attribute information) of each point. Therefore, coding of a point cloud is performed for each of geometry data thereof and attribute data thereof.

Various methods have been proposed as a coding method of attribute data. For example, the use of a technique called Lifting has been proposed (for example, refer to NPL 2). In addition, a method of enabling attribute data to be scalably decoded has also been proposed (for example, refer to NPL 3). Furthermore, although not Lifting, a method enabling decoded attribute data to be referred to in an LoD has been devised (for example, refer to NPL 4).

In any case, coding of attribute data is performed using a positional relationship between points on the assumption that geometry data including deterioration due to compression is known. More specifically, coding of attribute data is performed using a correlation between points that are spatially close to each other. In order to use such a correlation between points, points in a three-dimensional space are mapped to one dimension using a Morton code and then sorted according to values of the Morton code. In other words, each point is arranged in a Morton order. Accordingly, it is guaranteed that mapped points being adjacent to each other on the one dimension are spatially close to each other.

CITATION LIST

Non Patent Literature

[NPL 1] R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf
[NPL 2] Khaled Mammou, Alexis Tourapis, Jungsun Kim, Fabrice Robinet, Valery Valentin, Yeping Su, "Lifting Scheme for Lossy Attribute Encoding in TMC1", ISO/IEC JTC1/SC29/WG11 MPEG2018/m42640, April 2018, San Diego, US
[NPL 3] Ohji Nakagami, Satoru Kuma, "[G-PCC] Spatial scalability support for G-PCC", ISO/IEC JTC1/SC29/WG11 MPEG2019/m47352, March 2019, Geneva, CH
[NPL 4] Toshiyasu Sugio, "[G-PCC] Reference structure modification on attribute predicting transform in TMC13", ISO/IEC JTC1/SC29/WG11 MPEG2018/m46107, January 2019, Marrakech, MA

SUMMARY

Technical Problem

However, the sorting processing creates a risk of increasing a load of decoding processing of coded data of a point cloud.

The present disclosure has been devised in consideration of the situation described above and an object thereof is to enable an increase in a load of decoding processing of coded data of a point cloud to be suppressed.

Solution to Problem

An information processing apparatus according to an aspect of the present technique is an information processing apparatus including a coding portion configured to encode positional information of a point cloud expressing an object with a three-dimensional shape as a set of points in an order which causes a decoding result of coded data of the positional information to be output in a processing order of attribute information of the point cloud and to generate the coded data.

An information processing method according to an aspect of the present technique is an information processing method including the step of: coding positional information of a point cloud expressing an object with a three-dimensional shape as a set of points in an order which causes a decoding result of coded data of the positional information to be output in a processing order of attribute information of the point cloud and generating the coded data.

An information processing apparatus according to another aspect of the present technique is an information processing apparatus including a decoding portion configured to decode coded data of positional information of a point cloud expressing an object with a three-dimensional shape as a set of points and to output a decoding result in a processing order of attribute information of the point cloud.

An information processing method according to another aspect of the present technique is an information processing method including the step of decoding coded data of positional information of a point cloud expressing an object with a three-dimensional shape as a set of points and outputting a decoding result in a processing order of attribute information of the point cloud.

In the information processing apparatus and the information processing method according to the aspect of the present technique, positional information of a point cloud expressing an object with a three-dimensional shape as a set of points is encoded in an order which causes a decoding result of coded data of the positional information to be output in a processing order of attribute information of the point cloud and coded data of the positional information is generated.

In the information processing apparatus and the information processing method according to the other aspect of the present technique, coded data of positional information of a point cloud expressing an object with a three-dimensional shape as a set of points is decoded and a decoding result thereof is output in a processing order of attribute information of the point cloud.

BRIEF DESCRIPTION OF DRAWINGS

FIG. 2 is a diagram for explaining a coding method and a decoding method of geometry data.

FIG. 14 is a flow chart for explaining an example of a flow of decoding processing.

FIG. 15 is a flow chart for explaining an example of a flow of positional information decoding processing.

DESCRIPTION OF EMBODIMENTS

Figure 1:
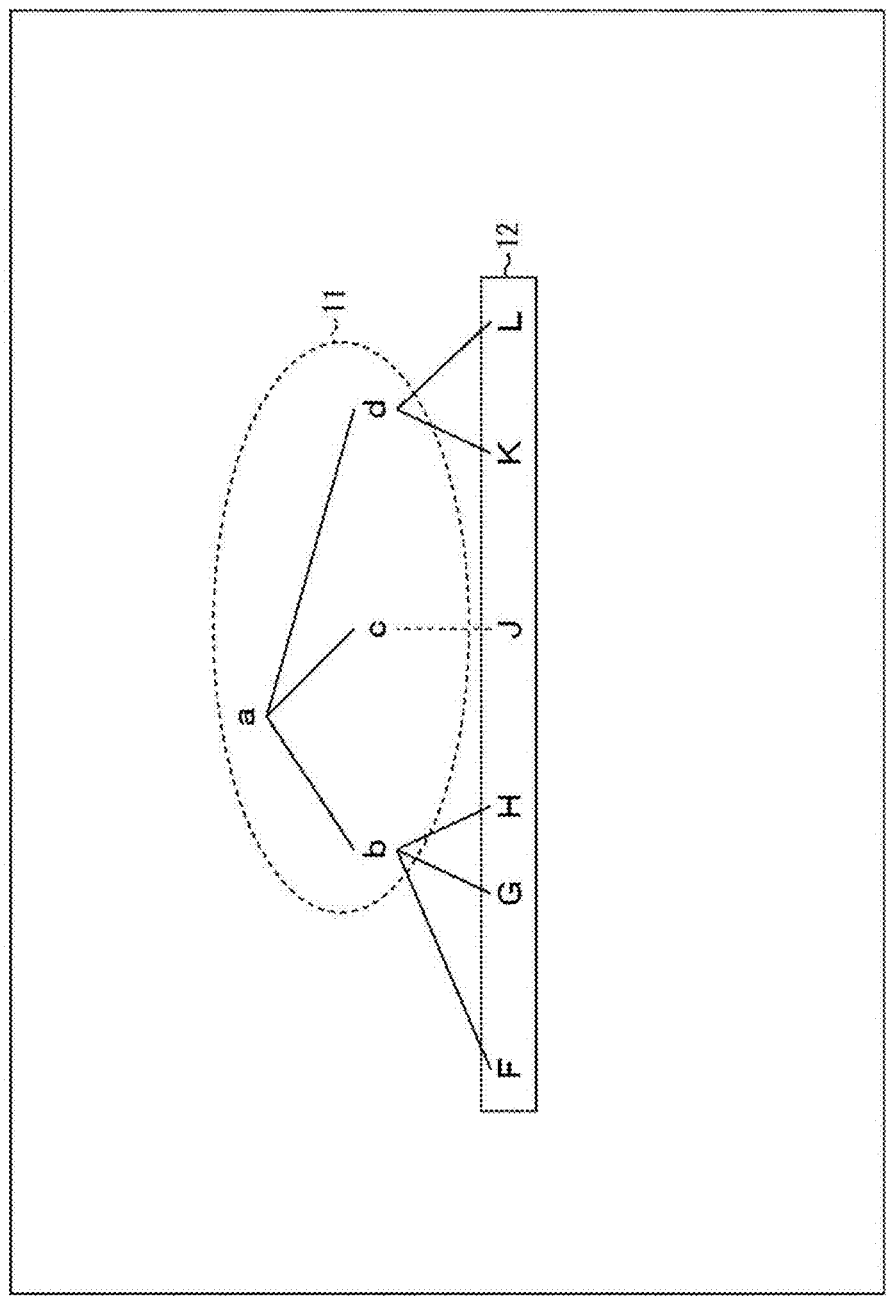
FIG. 1 is a diagram for explaining an example of a processing order of geometry data.

Hereinafter, modes (hereinafter, referred to as embodiments) for implementing the present disclosure will be described. The description will be given in the following order.

1. Guarantee of output order of decoding result
2. First embodiment (coding apparatus)
3. Second embodiment (decoding apparatus)
4. Appendix

1. Guarantee of Output Order of Decoding Result

<Documents Supporting Technical Contents, Technical Terms, and the Like>

The scope disclosed in the present technique not only includes contents described in the embodiments but also includes contents described in the non-patent literature listed below which are known at the time of application.

NPL 1: (described above)
NPL 2: (described above)
NPL 3: (described above)
NPL 4: (described above)
NPL 5: Sebastien Lasserre, David Flynn, "[PCC] Inference of a mode using point location direct coding in TMC3", ISO/IEC JTC1/SC29/WG11 MPEG2018/m42239, January 2018, Gwangju, Korea In other words, contents described in the NPL listed above will also constitute a basis when determining support requirements.

<Point Cloud>

Conventionally, there is 3D data such as a point cloud which represents a three-dimensional structure using positional information, attribute information, and the like of a point group and a mesh which is constituted of vertices, edges, and faces and which defines a three-dimensional shape using a polygonal expression.

For example, in the case of a point cloud, a three-dimensional structure (an object with a three-dimensional shape) is expressed as a set of a large number of points (a point group). In other words, data of a point cloud (also referred to as point cloud data) is constituted of geometry data (also referred to as positional information) and attribute data (also referred to as attribute information) of each point of the point group. Attribute data can include any kind of information. For example, color information, reflectance information, normal information, and the like may be included in attribute data. Therefore, since a data structure is relatively simple and, at the same time, a sufficiently large number of points are used, an arbitrary three-dimensional structure can be expressed with sufficient accuracy.

<Quantization of Positional Information Using Voxel>

Since a data amount of such point cloud data is relatively large, a coding method using a voxel has been devised in order to compress a data amount due to coding and the like. A voxel refers to a three-dimensional region for quantizing geometry data (positional information).

Specifically, a three-dimensional region enclosing the point cloud is divided into small three-dimensional regions called voxels and, for each voxel, whether or not the voxel encloses a point is shown. Accordingly, a position of each point is quantized in units of voxels. Therefore, by transforming point cloud data into data of such voxels (also referred to as voxel data), an increase in an amount of information can be suppressed (typically, an amount of information can be reduced).

<Octree>

Furthermore, it was devised to construct an Octree using such voxel data with respect to geometry data. An Octree is a tree structure representation of voxel data. A value of each bit of a lowest-order node of an Octree indicates a presence or absence of a point of each voxel. For example, a value "1" indicates a voxel enclosing a point and a value "0" indicates a voxel not enclosing a point. In an Octree, one node corresponds to eight voxels. In other words, each node of an Octree is constituted of 8-bit data and the eight bits indicate a presence or absence of a point of eight voxels.

In addition, an upper-order node of the Octree indicates a presence or absence of a point of a region that brings together eight voxels corresponding to lower-order nodes belonging to the upper-order node. In other words, an upper-order node is generated by compiling information on voxels of lower-order nodes. When a value of a node is "0" or, in other words, when all of eight corresponding voxels do not enclose a point, the node is deleted.

Accordingly, an Octree constituted of nodes of which values are not "0" is constructed. In other words, an Octree is capable of indicating a presence or absence of a point of a voxel at each resolution. Due to a transformation into an Octree and coding, by decoding positional information from a highest resolution (uppermost layer) to a desired level (resolution), point cloud data at the resolution can be restored. Specifically, decoding can be readily performed at an arbitrary resolution without having to decode information of unnecessary levels (resolutions). In other words, scalability of voxels (resolutions) can be realized.

In addition, by omitting nodes of which the value is "0" as described above, a resolution of a voxel in a region where a point is absent can be reduced and an increase in the amount of information can be further suppressed (typically, the amount of information can be further reduced).

<Lifting>

By comparison, when coding attribute data (attribute information), coding is performed using a positional relationship between points on the assumption that geometry data (positional information) including deterioration due to coding is known. As such a coding method of attribute data, a method using RAHT (Region Adaptive Hierarchical Transform) or a method using a transformation called Lifting such as that described in NPL 2 have been devised. Applying these techniques also enables attribute data to be hierarchized in a similar manner to an Octree of geometry data.

For example, in the case of Lifting described in NPL 2, attribute data of each point is encoded as a difference value from a predicted value derived using attribute data of another point. In doing so, each point is hierarchized and the difference value is derived in accordance with a hierarchical structure thereof.

In other words, with respect to attribute data for each point, each point is classified into a predicted point and a reference point, a predicted value of attribute data of the predicted point is derived using attribute data of the reference point, and a difference value between the attribute data of the predicted point and a predicted value is derived. The attribute data of each point is hierarchized by recursively repeating such processing with respect to the reference point.

However, this hierarchical structure is generated independently of a hierarchical structure (for example, an Octree) of geometry data and basically does not correspond to the hierarchical structure of geometry data. In order to restore point cloud data, geometry data and attribute data must be associated with each other and, in order to do so, geometry data and attribute data must be decoded to a highest resolution (in other words, a lowermost layer). In other words, the method of applying Lifting described in NPL 2 does not accommodate scalable decoding of resolutions.

<Hierarchization Accommodating Scalable Decoding>

By contrast, hierarchization described in NPL 3 accommodates scalable decoding of resolutions. In the case of the method described in NPL 3, hierarchization of attribute data is performed so as to match a hierarchical structure of an Octree of geometry data. Specifically, selection of a reference point and a predicted point is performed such that when a point is present in a region corresponding to a voxel of geometry data (when there is attribute data corresponding to the point), a point is also present in a voxel that is higher by one level than the voxel (there is attribute data corresponding to the point). In other words, attribute information is hierarchized in accordance with the hierarchical structure of the Octree of geometry data.

Associating the hierarchical structure of attribute data to the hierarchical structure of geometry data enables point cloud data of a desired resolution to be readily restored without having to decode down to a lowermost layer. As described above, the method of applying the technique described in NPL 3 accommodates scalable decoding of resolutions.

<Sorting Processing>

In any case, coding and decoding of attribute data are performed using a correlation between points that are spatially close to each other. In order to use such a correlation between points, points in a three-dimensional space are mapped to one dimension using a Morton code and then sorted according to values of the Morton code. In other words, sorting processing is performed with respect to geometry data and each point is arranged in a Morton order. Accordingly, it is guaranteed that mapped points being adjacent to each other on the one dimension are spatially close to each other.

For example, in an Octree of geometry data shown in FIG. 1, nodes b to d belong to node a, points F to H belong to node b, point J belongs to node c, and points K and L belong to node d. Node a, node b, and node d are subjected to Octree coding and node c is encoded by applying a DCM (Direct Coding Mode).

By decoding nodes a to d enclosed by a dotted circle 11 among coded data of an Octree constructed as described above, points F to L enclosed by a solid square 12 are output.

In doing so, processing is started from node a and processing proceeds to node b, node c, and node d. However, a processing order of the processing of node b, node c, and node d is not defined and processing can also be performed in parallel. In addition, since node c has been encoded by applying DCM, generally, point J is output earlier than the other points.

Furthermore, while points F to H are output as decoding results by processing node b, an output order of points F to H is not defined. In a similar manner, while points K and L are output as decoding results by processing node d, an output order of points K and L is not defined.

Therefore, an output order of each point is as follows. It should be noted that an output order of points shown in parentheses is in no particular order.

J, ((F, G, H), (K, L))

In other words, an output order of points F to H is in no particular order, an output order of points K and L is in no particular order, and an output order of points F to H and points K and L is in no particular order.

As described above, since an output order of geometry data of each point has a certain degree of freedom, there is a possibility that the output order of geometry data does not match a processing order of attribute data. In other words, there is no guarantee that the geometry data of each point is to be output in the processing order of attribute data. Therefore, in order to perform processing of attribute data in the processing order described above, sorting processing of points using geometry data as described above is necessary.

However, the sorting processing has a high calculation cost or, in other words, imposes a large load of processing. That is, the sorting processing requires a significant amount of processing and significant processing time. Therefore, performing the sorting processing creates a risk of increasing a load of decoding processing of coded data of a point cloud. For example, an increase in calculation cost due to the sorting processing may possibly make it difficult to perform processing for decoding coded data of a point cloud in real time. Therefore, in order to reliably realize real-time processing of decoding coded data of a point cloud, there is a risk of an increase in implementation cost.

<Guarantee of Output Order of Decoding Result>

In consideration thereof, as in "method 1" described in an uppermost row in a table shown in FIG. 2, the output order of a decoding result of geometry data is set to a predetermined order. For example, geometry data is encoded so as to guarantee that the output order of a decoding result of the geometry data is a predetermined order. Accordingly, since sorting processing of points is no longer necessary, an increase in a load of decoding processing of coded data of a point cloud can be suppressed. Therefore, an increase in implementation cost in order to reliably realize real-time processing of decoding coded data of a point cloud can be suppressed.

In addition, for example, coded data of geometry data is decoded so that the decoding result is output in a predetermined order. Accordingly, since sorting processing of points is no longer necessary, an increase in a load of decoding processing of coded data of a point cloud can be suppressed. Therefore, an increase in implementation cost in order to reliably realize real-time processing of decoding coded data of a point cloud can be suppressed.

For example, in the case of the Octree of geometry data shown in FIG. 1, it is guaranteed that, at node b, decoding results of a point F to H are output in an order of point F→point G→point H. In addition, it is guaranteed that, at node d, decoding results of a point K and L are output in an order of point K→point L. Furthermore, it is guaranteed that a decoding results of a point (points F to H) respectively belonging to nodes b to d are output in an order of node b→node d.

Accordingly, an output order of each point is as follows.

J, F, G, H, K, L

In other words, the output order is fixed and becomes known. Therefore, since sorting processing of points is no longer necessary, an increase in a load of decoding processing of coded data of a point cloud can be suppressed.

The predetermined order may be any order as long as the order becomes known when decoding coded data of geometry data. For example, as in "method 1-1" described in a second from top row in the table shown in FIG. 2, the predetermined order may be a Morton order. Outputting in a Morton order guarantees that adjacent points in the output order are in spatial vicinity of each other.

In addition, for example, as in "method 1-2" described in a third from top row in the table shown in FIG. 2, the predetermined order may be a processing order of attribute data. In other words, the output order of a decoding result of geometry data may be the same as the processing order of attribute data.

For example, geometry data (positional information) of a point cloud expressing an object with a three-dimensional shape as a set of points may be encoded in an order which causes a decoding result of coded data of the geometry data to be output in a processing order of attribute data (attribute information) of the point cloud and coded data thereof may be generated.

In addition, for example, in an information processing apparatus, a coding portion may be provided which is configured to encode geometry data (positional information) of a point cloud expressing an object with a three-dimensional shape as a set of points in an order which causes a decoding result of coded data of the geometry data to be output in a processing order of attribute data (attribute information) of the point cloud and to generate coded data thereof.

Performing coding in this manner guarantees that, during decoding, the geometry data of a decoding result is to be output in a same order as the processing order of the attribute data. Therefore, since sorting processing of points is no longer necessary, an increase in a load of decoding processing of coded data of a point cloud can be suppressed. Therefore, an increase in implementation cost in order to reliably realize real-time processing of decoding coded data of a point cloud can be suppressed.

It should be noted that a method of coding of geometry data is arbitrary. For example, when coding geometry data by applying CABAC (Context-based Adaptive Binary Arithmetic Code), since context is used, the coded data is decoded in a same order as a coding order. Therefore, in this case, coding geometry data in the processing order of attribute data guarantees that, during decoding, the geometry data of a decoding result is to be output in a same order as the processing order of the attribute data.

In addition, for example, coded data of positional information of a point cloud expressing an object with a three-dimensional shape as a set of points may be decoded and a decoding result thereof may be output in a processing order of attribute information of the point cloud.

For example, in an information processing apparatus, a decoding portion may be provided which is configured to decode coded data of positional information of a point cloud expressing an object with a three-dimensional shape as a set of points and to output a decoding result thereof in a processing order of attribute information of the point cloud.

Since performing decoding in this manner causes geometry data of a decoding result to be output in a same order as the processing order of attribute data, sorting processing of points need no longer be performed. Therefore, an increase in a load of decoding processing of coded data of a point cloud can be suppressed. Therefore, an increase in implementation cost in order to reliably realize real-time processing of decoding coded data of a point cloud can be suppressed.

It should be noted that a method of decoding of geometry data is arbitrary as long as the method of decoding corresponds to the coding method. For example, when geometry data is encoded by applying CABAC, since a context is used to decode the coded data thereof, the coded data of the geometry data may be decoded in accordance with an arrangement order thereof (in other words, a coding order of the geometry data). Performing decoding in this manner guarantees that the geometry data of a decoding result is to be output in a same order as the processing order of attribute data.

It should be noted that an output order of a decoding result (in other words, a processing order of attribute data) may be any order. For example, the decoding result may be configured to be output in a Morton order (in other words, the attribute data may be configured to be processed in a Morton order). Outputting in a Morton order guarantees that adjacent points in the output order are in spatial vicinity of each other.

In addition, geometry data may be arranged in a tree structure. Furthermore, as in "method 1-3" described in a fourth from top row in the table shown in FIG. 2, it may be guaranteed that an output order of a decoding result is to be a predetermined order (for example, a processing order of attribute data or a Morton order) at each node of the tree structure. For example, geometry data arranged in a tree structure may be encoded in an order such that a decoding result at each node of the tree structure is output in a processing order of attribute data of a point cloud. Alternatively, for example, coded data of geometry data arranged in a tree structure may be decoded and a decoding result at each node of the tree structure may be output in a processing order of attribute data of a point cloud.

Accordingly, since the need to perform sorting processing of points can be eliminated even when coding or decoding geometry data of a tree structure, an increase in a load of decoding processing of coded data of a point cloud can be suppressed.

It should be noted that the tree structure may be any tree structure. For example, the tree structure may be an Octree. Alternatively, for example, the tree structure may be a KD-tree.

<DCM>

In addition, as a coding method of geometry data arranged in a tree structure, a method of applying DCM (Direct Coding Mode) may also be used besides methods using the tree structure (for example, Octree coding using an Octree).

For example, when a node that is a processing object satisfies a predetermined condition and is determined to be sparse while arranging voxel data in an Octree, the DCM is applied and a relative distance (in each of xyz directions) from the processing object node to each leaf (point) directly or indirectly belonging to the processing object node is obtained and encoded.

It should be noted that a "node directly belonging . . . " refers to a node that is suspended from another node in a tree structure. For example, a node directly belonging to a processing object node refers to a node which belongs to the processing object node and which is one level lower than the processing object node (a so-called child node). It addition, a "node indirectly belonging . . . " refers to a node that is suspended from another node via yet another node in a tree structure. For example, a node indirectly belonging to a processing object node refers to a node which belongs to the processing object node via another node and which is two or more levels lower than the processing object node (for example, a so-called grandchild node).

Accordingly, applying DCM enables coding and decoding of nodes of intermediate levels between the processing object node and each leaf directly or indirectly belonging to the processing object node to be omitted. In other words, when coding and decoding the processing object node, each leaf directly or indirectly belonging to the processing object node can be encoded and decoded. Therefore, an increase in a load of coding and decoding can be suppressed.

<Guarantee of Output Order Corresponding to DCM>

Even in such cases where DCM is applied, it may be guaranteed that the output order of a decoding result of geometry data is to be a predetermined order. However, since a processing order of leafs (points) to which DCM has been applied is dependent on a processing order of nodes that are processing objects, it is difficult to control the processing order and the processing order may differ from a case of Octree coding. In other words, it is difficult to control an output order of a decoding result of a point to which DCM is applied.

In consideration thereof, as in "method 1-4" described in a fifth from top row in the table shown in FIG. 2, control information related to an output order of a decoding result of a point to which DCM is applied may be signaled (transmitted from a coding side to a decoding side).

For example, on the coding side, geometry data of a sparse point may be encoded by applying DCM, coded data of the geometry data may be generated, and control information (also referred to as DCM order information) related to an output order of a decoding result of the coded data may be generated.

In addition, for example, on the decoding side, a decoding result of coded data of geometry data having been encoded by applying DCM may be output in an output order indicated by the DCM order information.

Accordingly, since it is guaranteed that points to which DCM is applied are to be output in an appropriate output order, the need to perform sorting processing of points can be similarly eliminated even when DCM is applied and an increase in a load of decoding processing of coded data of a point cloud can be suppressed.

It should be noted that the DCM order information may be any kind of information as long as an output order of a decoding result of a point to which DCM has been applied can be indicated. For example, the DCM order information may include information indicating an output order of a decoding result of a point to which DCM has been applied by an order from the top. In addition, the DCM order information may include information indicating an output order of a decoding result of a point to which DCM has been applied by a difference value from an output order of a decoding result of a point to which DCM has been applied and which is immediately previously output. Furthermore, the DCM order information may include information indicating an output order of a decoding result of a point to which DCM has been applied by a difference value from a predetermined reference order.

Figure 3:
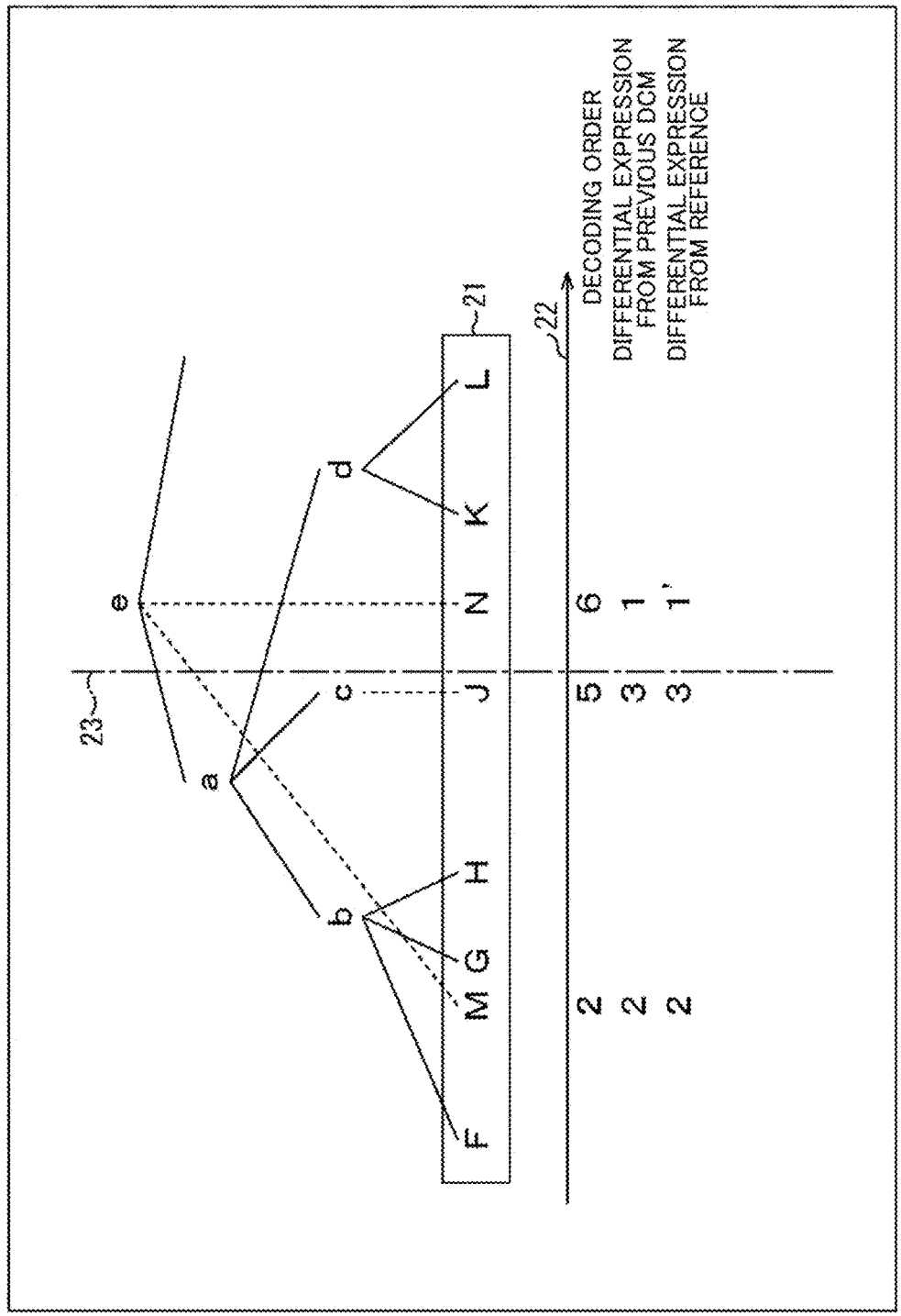
FIG. 3 is a diagram for explaining a method when applying DCM.

For example, in an Octree shown in FIG. 3, nodes a to d and points F to L are configured in a similar manner to that shown in FIG. 1. Node a belongs to node e. Points M and L that belong to node e are encoded and decoded by applying DCM.

Even in such a case, it is to be guaranteed that points F to N enclosed by a solid square 21 is output in an output order indicated by an arrow 22 as described above. As described with reference to FIG. 1, an output order of a decoding result of a point belonging to nodes to be subjected to Octree coding is guaranteed as described above. In other words, decoding results of point F, point G, point H, point K, and point L are output in an order of point F→point G→point H→point K→point L.

By comparison, since DCM is applied to point M, point J, and point N, point M, point J, and point N may not be processed in the order shown in FIG. 3. In consideration thereof, the points are caused to be output in a correct order using DCM order information.

Since a decoding result of each point is to be output in an order from left to right in FIG. 3, it is assumed that a correct output order of the decoding result of point M is 2, a correct output order of the decoding result of point J is 5, and a correct output order of the decoding result of point N is 6.

For example, the DCM order information may indicate an output order of the decoding result by an order from the top (for example, a decoding order). In this case, the DCM order information indicates the output order of the decoding result of point M as "2", the output order of the decoding result of point J as "5", and the output order of the decoding result of point N as "6".

In addition, for example, the DCM order information may indicate an output order of the decoding result by a difference value from an output order of a decoding result of a point to which DCM has been applied and which is immediately previously output. In this case, the DCM order information indicates the output order of the decoding result of point M as "2" (a value obtained by subtracting the top "0" from the output order "2" of the decoding result of point M). In addition, the DCM order information indicates the output order of the decoding result of point J as "3" (a value obtained by subtracting the output order "2" of the decoding result of point M from the output order "5" of the decoding result of point J). Furthermore, the DCM order information indicates the output order of the decoding result of point N as "1" (a value obtained by subtracting the output order "5" of the decoding result of point J from the output order "6" of the decoding result of point N).

Accordingly, a coding amount of DCM order information can be reduced as compared to a case where an output order of a decoding result is indicated by an order from the top (for example, a decoding order). In other words, a decline in coding efficiency can be suppressed.

In addition, for example, the DCM order information may indicate an output order of a decoding result by a difference value from a predetermined reference order. For example, a grid which divides points into units constituted of a predetermined number of points may be provided and a difference value may be initialized (changed to "0") in such grid units. In the example shown in FIG. 3, a dashed-dotted line 23 indicates one grid unit. Therefore, in the case of this example, a grid unit is provided for every five points. When deriving a difference value from an immediately previous point to which DCM has been applied, once such a grid unit is exceeded, the difference value thereof is reset.

In this case, the DCM order information indicates the output order of the decoding result of point M as "2" (a value obtained by subtracting the top "0" from the output order "2" of the decoding result of point M). In addition, the DCM order information indicates the output order of the decoding result of point J as "3" (a value obtained by subtracting the output order "2" of the decoding result of point M from the output order "5" of the decoding result of point J). Furthermore, the DCM order information indicates the output order of the decoding result of point N as "1" (a value obtained by subtracting the grid unit "5" indicated by the dashed-dotted line 23 from the output order "6" of the decoding result of point N). In FIG. 3, "1'" is a representation for indicating that a difference value has been initialized.

Accordingly, a coding amount of DCM order information can be reduced as compared to a case where an output order of a decoding result is indicated by a difference value from an immediately previous point to which DCM has been applied. In other words, a decline in coding efficiency can be suppressed.

On the coding side, such DCM order information is generated and transmitted to the decoding side. On the decoding side, the transmitted DCM order information is acquired and an output order of a decoding result of a point to which DCM has been applied is controlled based on the DCM order information. In other words, a decoding result of a point to which DCM has been applied is to be output in a correct output order. Specifically, based on DCM order information, a decoding result of a point to which DCM has been applied is inserted to a position representing a correct output order in a sequence of decoding results of Octree-encoded data arranged in an output order.

Accordingly, since the need to perform sorting processing of points can be eliminated even when DCM is applied, an increase in a load of decoding processing of coded data of a point cloud can be suppressed.

<Control Information of Intermediate Level>

Coded data of geometry data arranged in a tree structure such as described above can be scalably decoded. In other words, geometry data can be decoded at a resolution of a level other than a lowermost layer (a higher layer than the lowermost layer).

Figure 4:
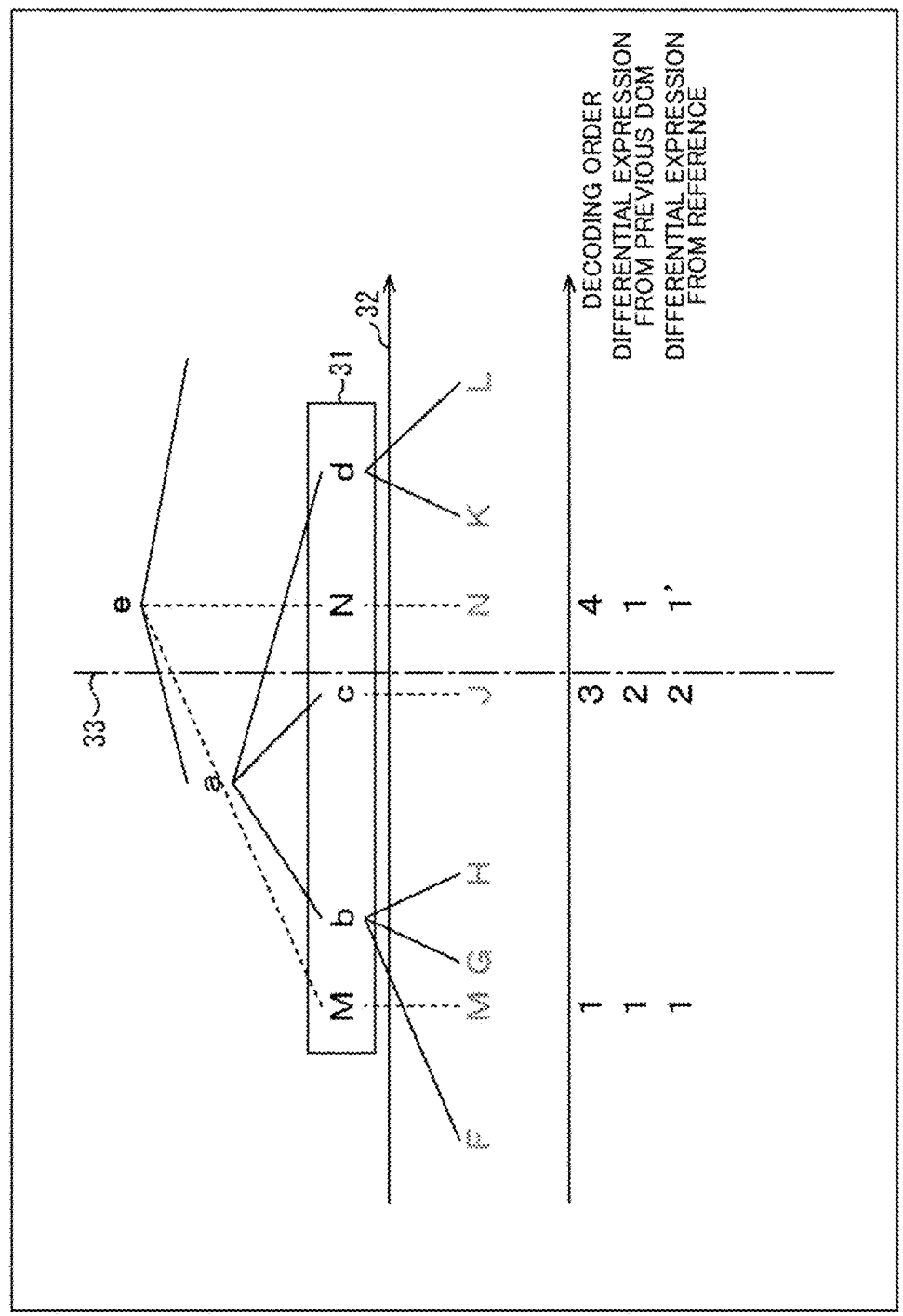
FIG. 4 is a diagram for explaining a method when applying DCM.

However, positions (output orders) of points to which DCM has been applied as described above may change depending on a level. For example, as shown in FIG. 4, let us assume that a decoding result of each node (point) of a level enclosed by a solid square 31 is output in an order indicated by an arrow 32.

In this case, an output order of point M, point J (node c), and point N to which DCM is applied differs from the case shown in FIG. 3.

In consideration thereof, as in "method 1-5" described in a sixth from top row in the table shown in FIG. 2, control information (DCM order information) may also be generated on an intermediate level of a tree structure. For example, with respect to a given point to which DCM is applied, control information (DCM order information) may be generated with respect to all levels (or a part of the levels) from a node that is a processing object to be subjected to coding by applying DCM to the given point.

In addition, such control information (DCM order information) may be signaled (transmitted from the coding side to the decoding side). Furthermore, on the decoding side, an output order of a decoding result of a point to which DCM is applied may be controlled based on such control information (DCM order information).

In other words, the control information (DCM order information) may be configured to include information related to an output order of the decoding result in an intermediate level of the tree structure.

Even in the case of the intermediate level, the control information may express an output order of a decoding result in a similar manner to the lowermost layer described above. For example, the control information may indicate an output order of the decoding result of a point to which DCM has been applied by an order from the top (for example, a decoding order). In the example shown in FIG. 4, the control information in this case indicates the output order of the decoding result of point M as "1", the output order of the decoding result of point J as "3", and the output order of the decoding result of point N as "4".

In addition, for example, the control information may indicate an output order of a decoding result of a point to which DCM has been applied by a difference value from an output order of a decoding result of a point to which DCM has been applied and which is immediately previously output. In the example shown in FIG. 4, the control information in this case indicates the output order of the decoding result of point M as "1" (a value obtained by subtracting a top "0" from the output order "1" of the decoding result of point M), the output order of the decoding result of point J as "2" (a value obtained by subtracting the output order "1" of the decoding result of point M from the output order "3" of the decoding result of point J), and the output order of the decoding result of point N as "1" (a value obtained by subtracting the output order "3" of the decoding result of point J from the output order "4" of the decoding result of point N).

Accordingly, a coding amount of control information can be reduced as compared to a case where an output order of a decoding result is indicated by an order from the top (for example, a decoding order). In other words, a decline in coding efficiency can be suppressed.

In addition, for example, the control information of points to which DCM has been applied may indicate an output order of a decoding result by a difference value from a predetermined reference order. For example, a grid which divides points into units constituted of a predetermined number of points may be provided and a difference value may be initialized (changed to "0") in such grid units. In the example shown in FIG. 4, a dashed-dotted line 33 indicates one grid unit. Therefore, in the case of this example, a grid unit is provided for every three points. When deriving a difference value from an immediately previous point to which DCM has been applied, once such a grid unit is exceeded, the difference value thereof is reset.

In the example shown in FIG. 4, the control information in this case indicates the output order of the decoding result of point M as "1" (a value obtained by subtracting a top "0" from the output order "1" of the decoding result of point M), the output order of the decoding result of point J as "2" (a value obtained by subtracting the output order "1" of the decoding result of point M from the output order "3" of the decoding result of point J), and the output order of the decoding result of point N as "1" (a value obtained by subtracting a grid unit "3" indicated by the dashed-dotted line 23 from the output order "4" of the decoding result of point N). In FIG. 4, "1" is a representation for indicating that a difference value has been initialized.

Accordingly, a coding amount of control information can be reduced as compared to a case where an output order of a decoding result is indicated by a difference value from an immediately previous point to which DCM has been applied. In other words, a decline in coding efficiency can be suppressed.

Figure 5:
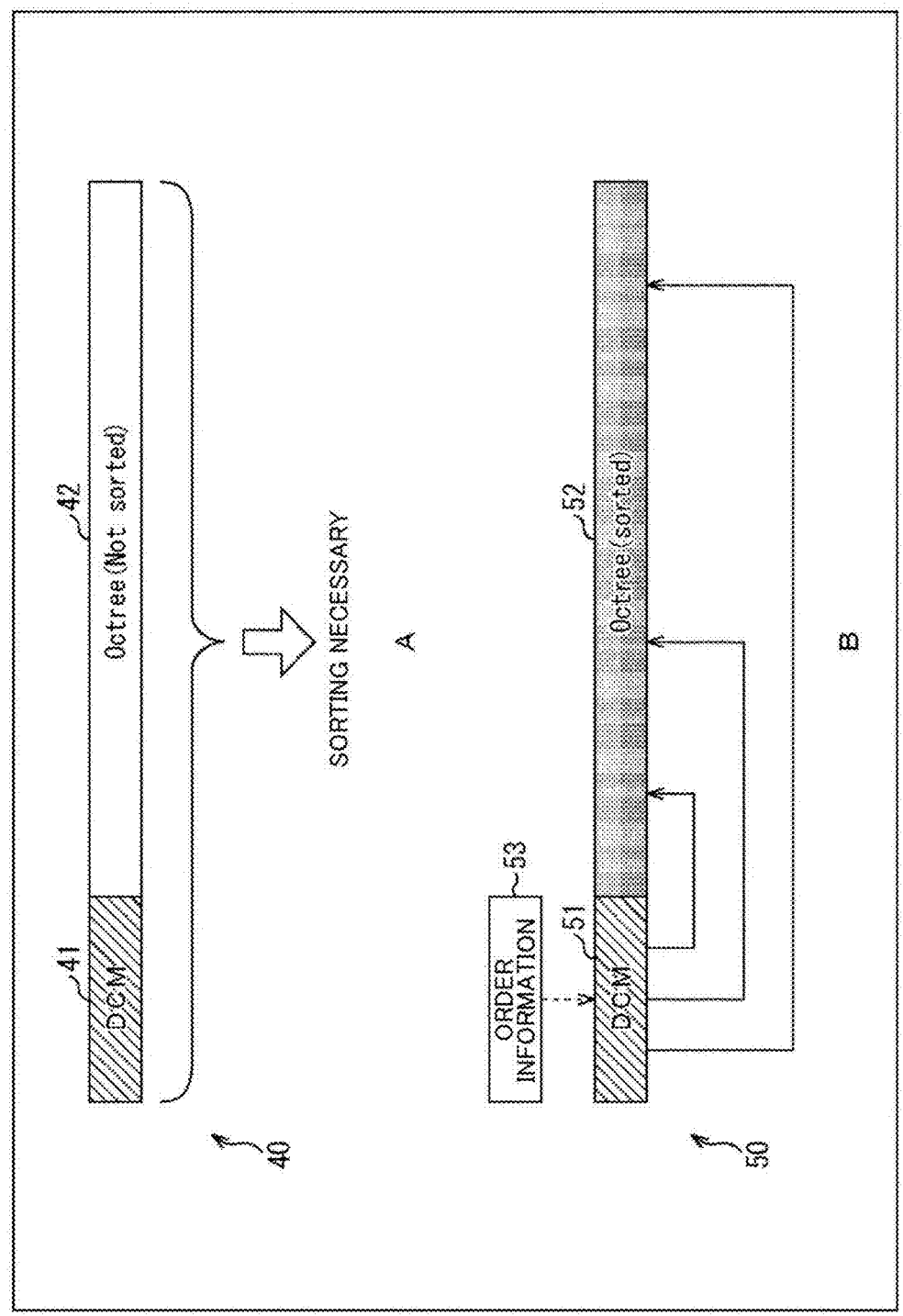
FIG. 5 is a diagram for explaining a method when applying DCM.

As shown in A in FIG. 5, in a case of a conventional bitstream 40 of geometry data, coded data 41 of points encoded by applying DCM and coded data 42 of points subjected to Octree coding are configured as pieces of data that differ from each other and are not arranged in a processing order. In addition, there is no information indicating a processing order of each point. Furthermore, the points subjected to Octree coding are also not arranged in a processing order. Therefore, a decoding result of coded data of each point must be sorted in a processing order of attribute data (for example, a Morton order).

By comparison, as shown in B in FIG. 5, as a result of applying the present technique described above, a bitstream 50 has coded data 51 of points encoded by applying DCM, coded data 52 of points subjected to Octree coding, and DCM order information 53. The DCM order information 53 indicates an output order of a decoding result of each point to which DCM has been applied. Therefore, on the decoding side, the decoding result of each point to which DCM has been applied is inserted into a correct position of a point group subjected to Octree coding based on the DCM order information 53.

Accordingly, there is no longer a need to sort a decoding result of geometry data and an increase in a load of decoding processing of coded data of a point cloud can be suppressed.

<Transmission Method of Control Information>

A transmission method of the control information described above is arbitrary. In other words, as in "method 1-6" described in a seventh from top row in the table shown in FIG. 2, the control information may be transmitted by a predetermined transmission method. For example, the control information may be included in coded data of geometry data. Alternatively, for example, the control information may be transmitted as data that differs from the coded data of geometry data. In this case, the control information may be associated with the coded data of geometry data using identification information or the like. For example, the control information may include identification information of geometry data of a corresponding data unit (for example, a slice).

2. First Embodiment

<Coding Apparatus>

Figure 6:
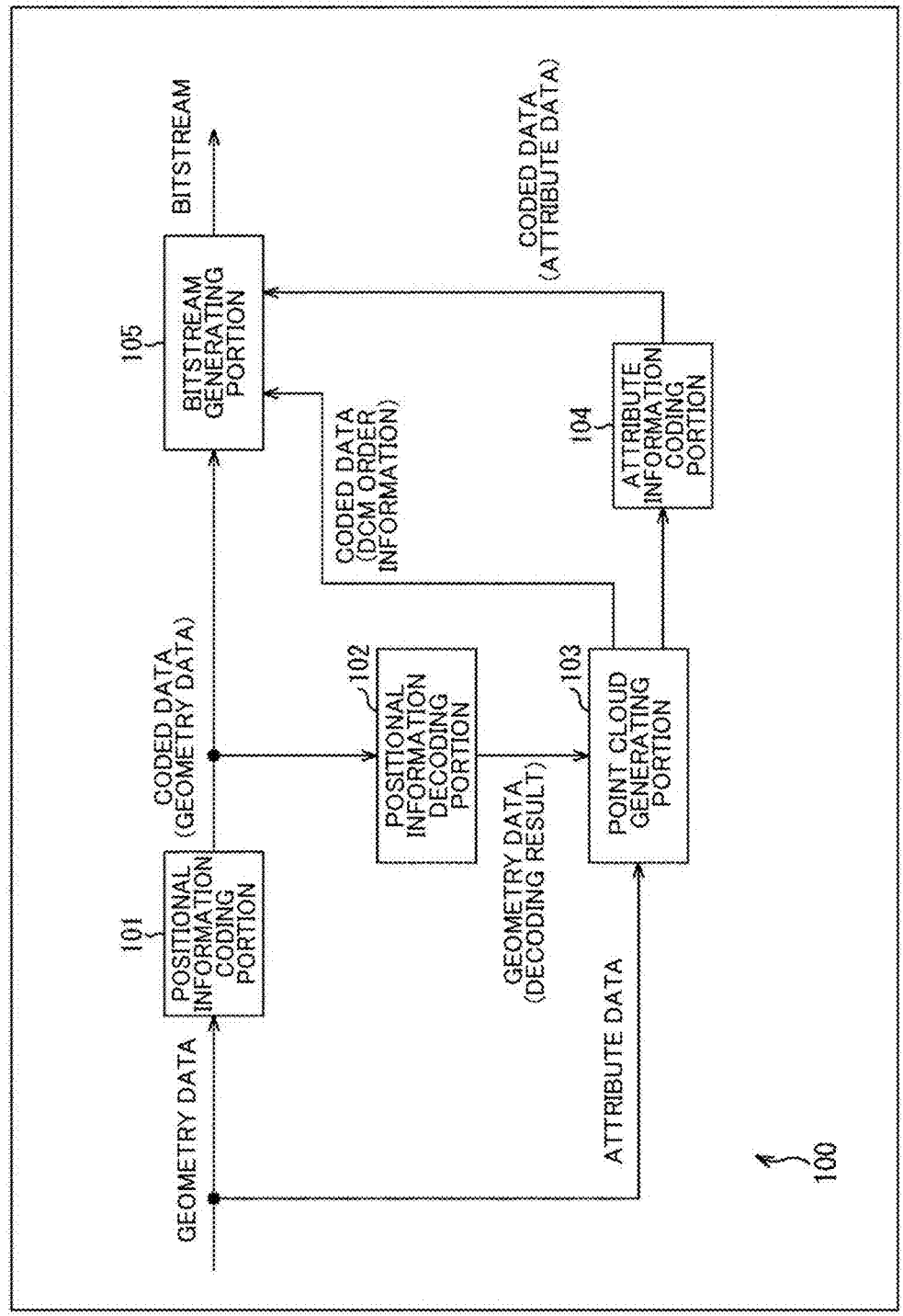
FIG. 6 is a block diagram showing a main configuration example of a coding apparatus.

Next, an apparatus to which the present technique described above in <1. Guarantee of output order of decoding result> is applied will be explained. FIG. 6 is a block diagram showing an example of a configuration of a coding apparatus that represents an aspect of the information processing apparatus to which the present technique is applied. A coding apparatus 100 shown in FIG. 6 is an apparatus which encodes a point cloud (3D data). The coding apparatus 100 encodes a point cloud by applying the present technique described above in <1. Guarantee of output order of decoding result>.

It should be noted that FIG. 6 shows main processing portions, main flows of data, and the like and that those shown in FIG. 6 do not represent all processing portions, all flows of data, and the like. In other words, in the coding apparatus 100, there may be processing portions not shown as a block in FIG. 6 and flows of processing or data not depicted by an arrow in FIG. 6.

As shown in FIG. 6, the coding apparatus 100 includes a positional information coding portion 101, a positional information decoding portion 102, a point cloud generating portion 103, an attribute information coding portion 104, and a bitstream generating portion 105.

The positional information coding portion 101 encodes geometry data (positional information) of a point cloud (3D data) input to the coding apparatus 100. For example, the positional information coding portion 101 hierarchizes the geometry data and generates an Octree, and encodes the Octree. In addition, for example, the positional information coding portion 101 encodes geometry data of a sparse point by applying DCM.

In doing so, the positional information coding portion 101 encodes the geometry data by applying the present technique described above in <1. Guarantee of output order of decoding result>. For example, the positional information coding portion 101 arranges the geometry data into an Octree and encodes the Octree so that a decoding result of the geometry data is output in a processing order of attribute data. The positional information coding portion 101 supplies the generated coded data of the geometry data to the positional information decoding portion 102 and the bitstream generating portion 105.

The positional information decoding portion 102 acquires coded data of the geometry data supplied from the positional information coding portion 101 and decodes the coded data. The decoding method is arbitrary as long as the method corresponds to the coding by the positional information coding portion 101. For example, processing such as filtering or inverse quantization for denoising may be performed. The positional information decoding portion 102 supplies the generated geometry data (a decoding result) to the point cloud generating portion 103.

The point cloud generating portion 103 acquires the attribute data (attribute information) of the point cloud that is input to the coding apparatus 100 and the geometry data (the decoding result) supplied from the positional information decoding portion 102. The point cloud generating portion 103 performs processing (recolor processing) for matching the attribute data to the geometry data (the decoding result). The point cloud generating portion 103 supplies attribute data associated with the geometry data (the decoding result) to the attribute information coding portion 104.

In addition, the point cloud generating portion 103 applies the present technique described above in <1. Guarantee of output order of decoding result> to perform processing for generating DCM order information indicating an output order of a decoding result of a point to which DCM is applied and encoding the DCM order information. The point cloud generating portion 103 supplies the generated coded data of the DCM order information to the bitstream generating portion 105.

The attribute information coding portion 104 acquires the geometry data (the decoding result) and the attribute data supplied from the point cloud generating portion 103. The attribute information coding portion 104 encodes the attribute data using the geometry data (the decoding result) and generates coded data of the attribute data. The attribute information coding portion 104 supplies the generated coded data of the attribute data to the bitstream generating portion 105.

The bitstream generating portion 105 acquires the coded data of the geometry data supplied from the positional information coding portion 101. In addition, the bitstream generating portion 105 acquires the coded data of the attribute data supplied from the attribute information coding portion 104. Furthermore, the bitstream generating portion 105 acquires coded data of the DCM order information supplied from the point cloud generating portion 103. The bitstream generating portion 105 generates a bitstream including these pieces of coded data. The bitstream generating portion 105 outputs the generated bitstream to the outside of the coding apparatus 100.

By adopting such a configuration, since the coding apparatus 100 no longer needs to perform sorting processing of points, an increase in a load of decoding processing of coded data of a point cloud can be suppressed. Therefore, the coding apparatus 100 can suppress an increase in implementation cost in order to reliably realize real-time processing of decoding coded data of a point cloud.

It should be noted that the processing portions (the positional information coding portion 101 to the bitstream generating portion 105) of the coding apparatus 100 respectively have arbitrary configurations. For example, each processing portion may be constituted of a logic circuit which realizes the processing described above. In addition, each processing portion may have a CPU (Central Processing Unit), a ROM (Read Only Memory), a RAM (Random Access Memory), or the like and may realize the processing described above by executing a program using the CPU, the ROM, the RAM, or the like. It is needless to say that each processing portion may have both configurations and may realize a part of the processing described above by a logic circuit and realize another part of the processing described above by executing a program. Alternatively, configurations of the respective processing portions may be independent of each other and, for example, a part of the processing portions may realize a part of the processing described above by a logic circuit, another part of the processing portions may realize the processing described above by executing a program, and yet other processing portions may realize the processing described above by both using a logic circuit and executing a program.

<Positional Information Coding Portion>

Figure 7:
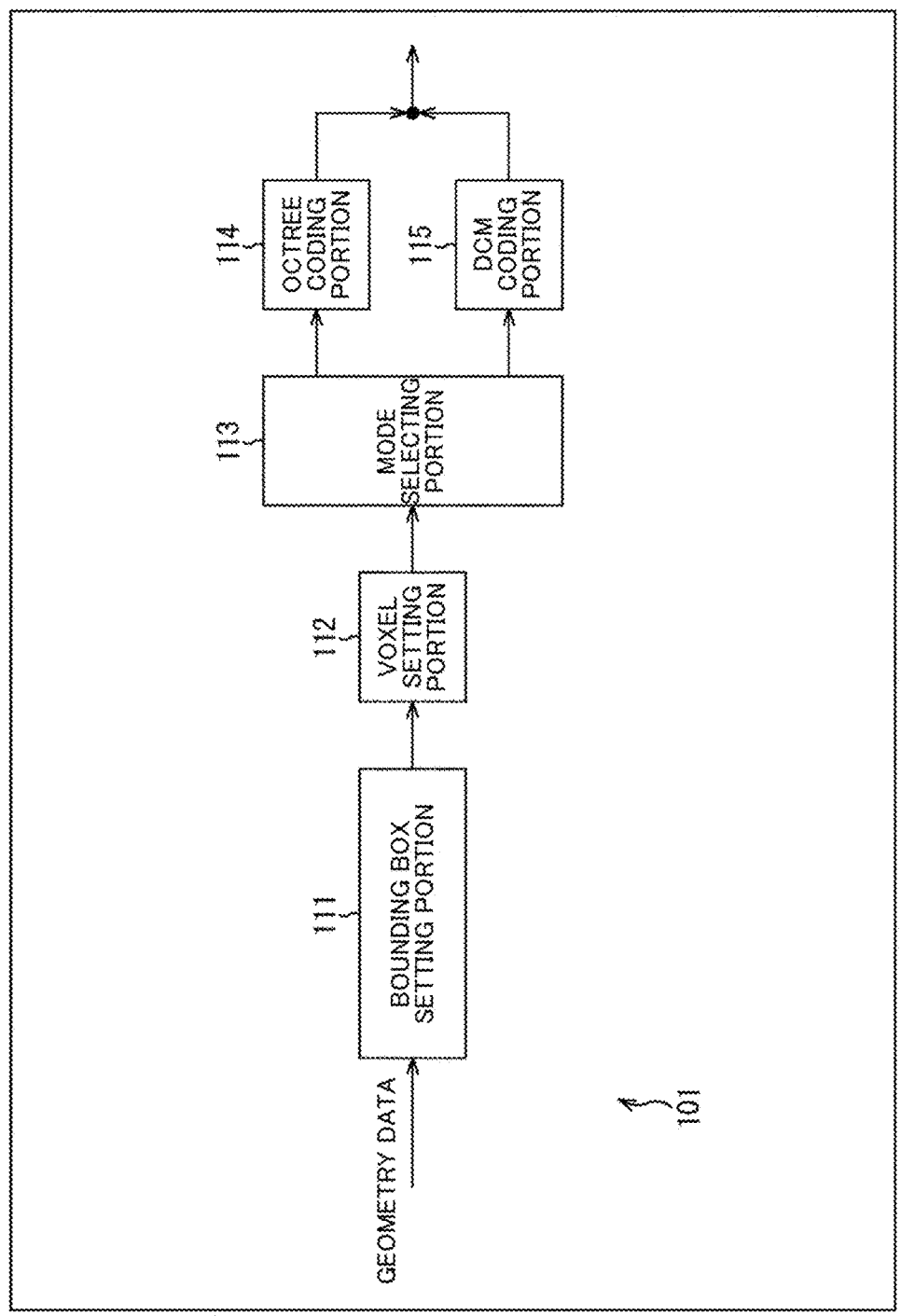
FIG. 7 is a block diagram showing a main configuration example of a positional information coding portion.

FIG. 7 is a block diagram showing a main configuration example of the positional information coding portion 101 (FIG. 6). It should be noted that FIG. 7 shows main processing portions, main flows of data, and the like and that those shown in FIG. 7 do not represent all processing portions, all flows of data, and the like. In other words, in the positional information coding portion 101, there may be processing portions not shown as a block in FIG. 7 and flows of processing or data not depicted by an arrow in FIG. 7.

The positional information coding portion 101 shown in FIG. 7 includes a bounding box setting portion 111, a voxel setting portion 112, a mode selecting portion 113, an Octree coding portion 114, and a DCM coding portion 115.

The bounding box setting portion 111 performs processing related to a setting of a bounding box. For example, the bounding box setting portion 111 acquires geometry data of point cloud data that is input to the coding apparatus 100. The bounding box setting portion 111 sets a bounding box with respect to the geometry data. The bounding box is information for normalizing geometry data that is a coding object. Voxelization is performed with the bounding box as a reference. The bounding box setting portion 111 supplies information regarding the bounding box to the voxel setting portion 112 together with geometry data.

The voxel setting portion 112 performs processing related to a setting of a voxel. For example, the voxel setting portion 112 acquires information regarding geometry data and a bounding box supplied from the bounding box setting portion 111. In addition, based on the information, the voxel setting portion 112 sets voxels by dividing the bounding box set with respect to the geometry data. In other words, the voxel setting portion 112 performs voxelization (quantization of a position of each point) of the geometry data. The voxel setting portion 112 supplies voxel data being geometry data having been voxelized in this manner to the mode selecting portion 113.

The mode selecting portion 113 performs processing related to a selection of a coding method (mode). For example, the mode selecting portion 113 acquires voxel data supplied from the voxel setting portion 112. In addition, the mode selecting portion 113 performs a selection of a coding method (mode) for each voxel (a node in an Octree). In other words, the mode selecting portion 113 selects whether to perform Octree coding or perform coding by applying DCM (also referred to as DCM coding) with respect to a voxel that is a processing object.

For example, the mode selecting portion 113 determines whether or not a voxel that is a processing object is sparse. When it is determined based on predetermined conditions that the voxel is not sparse, the mode selecting portion 113 selects Octree coding as the coding method and supplies the voxel data that is a processing object to the Octree coding portion 114. On the other hand, when it is determined based on the predetermined conditions that the voxel is sparse, the mode selecting portion 113 selects DCM coding as the coding method and supplies the voxel data that is a processing object to the DCM coding portion 115.

The Octree coding portion 114 performs processing related to coding using an Octree. For example, the Octree coding portion 114 acquires voxel data being a processing object that is supplied from the mode selecting portion 113. Using the voxel data, the Octree coding portion 114 generates Octree data (ChildMask) of a processing object node. The Octree coding portion 114 encodes the Octree data of the processing object node by a predetermined method to generate coded data.

In doing so, the Octree coding portion 114 performs coding by applying the present technique described above in <1. Guarantee of output order of decoding result> (for example, "method 1" in FIG. 2 (which may include methods 1-1 to 1-3)). In other words, the Octree coding portion 114 encodes the Octree data that is a processing object node so that a decoding result of the geometry data is output in a processing order of attribute data. For example, the Octree coding portion 114 encodes the Octree data that is a processing object node so that a decoding result of the geometry data are output in a Morton order. For example, the Octree coding portion 114 performs coding in an order such that a decoding result at each node of an Octree is output in a processing order of attribute data of a point cloud.

The Octree coding portion 114 supplies the coded data generated by performing coding as described above (coded data of voxel data that is a processing object node) to the positional information decoding portion 102 and the bitstream generating portion 105 (both shown in FIG. 6).

The DCM coding portion 115 performs processing related to coding using DCM. For example, the DCM coding portion 115 acquires voxel data being a processing object that is supplied from the mode selecting portion 113. The DCM coding portion 115 encodes the voxel data by applying DCM and generates coded data. For example, using the voxel data, the DCM coding portion 115 encodes a relative distance from a processing object node to a leaf and generates coded data. The DCM coding portion 115 supplies the generated coded data to the positional information decoding portion 102 and the bitstream generating portion 105 (both shown in FIG. 6).

By adopting such a configuration, the positional information coding portion 101 can perform Octree coding so as to guarantee that the output order of a decoding result of the geometry data is a predetermined order. Therefore, since sorting processing of points is no longer necessary, the coding apparatus 100 is capable of suppressing an increase in a load of decoding processing of coded data of a point cloud.

It should be noted that each of the processing portions of the positional information coding portion 101 (the bounding box setting portion 111 to the DCM coding portion 115) has an arbitrary configuration. For example, each processing portion may be constituted of a logic circuit which realizes the processing described above. In addition, each processing portion may have a CPU, a ROM, a RAM, or the like and may realize the processing described above by executing a program using the CPU, the ROM, the RAM, or the like. It is needless to say that each processing portion may have both configurations and may realize a part of the processing described above by a logic circuit and realize another part of the processing described above by executing a program. Alternatively, configurations of the respective processing portions may be independent of each other and, for example, a part of the processing portions may realize a part of the processing described above by a logic circuit, another part of the processing portions may realize the processing described above by executing a program, and yet other processing portions may realize the processing described above by both using a logic circuit and executing a program.

<Point Cloud Generating Portion>

Figure 8:
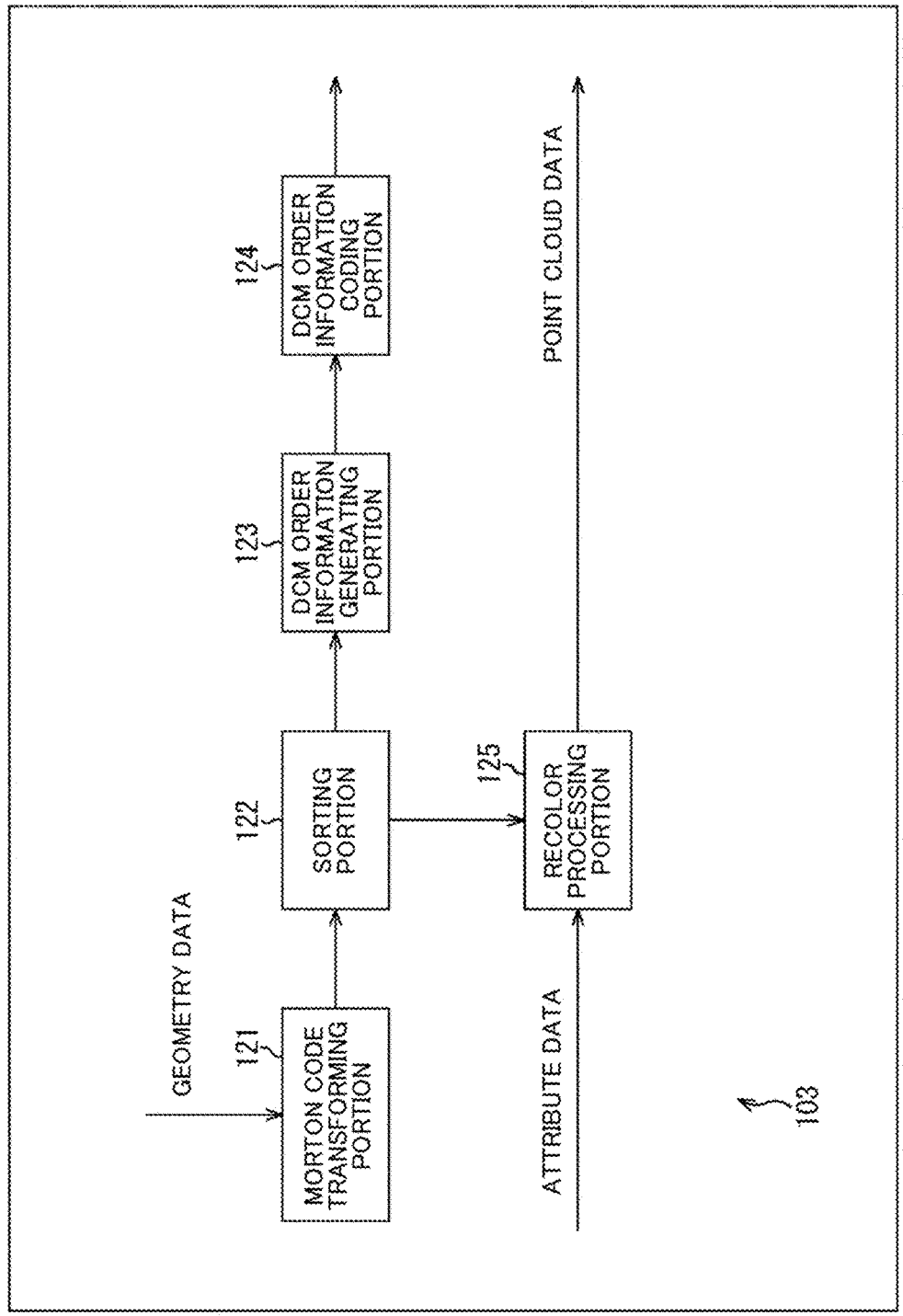
FIG. 8 is a block diagram showing a main configuration example of a point cloud generating portion.

FIG. 8 is a block diagram showing a main configuration example of the point cloud generating portion 103 (FIG. 6). It should be noted that FIG. 8 shows main processing portions, main flows of data, and the like and that those shown in FIG. 8 do not represent all processing portions, all flows of data, and the like. In other words, in the point cloud generating portion 103, there may be processing portions not shown as a block in FIG. 8 and flows of processing or data not depicted by an arrow in FIG. 8.

As shown in FIG. 8, the point cloud generating portion 103 includes a Morton code transforming portion 121, a sorting portion 122, a DCM order information generating portion 123, a DCM order information coding portion 124, and a recolor processing portion 125.

The Morton code transforming portion 121 transforms geometry data (a decoding result) supplied from the positional information decoding portion 102 (FIG. 6) into a Morton code. In other words, the Morton code transforming portion 121 uses the Morton code to map a point in a three-dimensional space to one dimension. The Morton code transforming portion 121 supplies geometry data of each point to which the Morton code has been added to the sorting portion 122.

The sorting portion 122 acquires geometry data supplied from the Morton code transforming portion 121 and performs sorting based on values of the Morton code. In other words, the sorting portion 122 sorts geometry data of each point in a Morton order. The sorting portion 122 supplies geometry data of each point having been sorted in the Morton order to the DCM order information generating portion 123 and the recolor processing portion 125.

The DCM order information generating portion 123 specifies a point to which DCM is applied during coding among geometry data of each point having been sorted in a Morton order and generates DCM order information that is control information indicating an output order of a decoding result of the point.

For example, the DCM order information may include information indicating an output order of a decoding result of the point to which DCM has been applied by an order from the top. In addition, the DCM order information may include information indicating an output order of a decoding result of the point to which DCM has been applied by a difference value from an output order of a decoding result of a point to which DCM has been applied and which is immediately previously output. Furthermore, the DCM order information may include information indicating an output order of a decoding result of the point to which DCM has been applied by a difference value from a predetermined reference order.

It should be noted that the DCM order information generating portion 123 may be configured to generate, even with respect to an intermediate level of an Octree, DCM order information that indicates an output order in the level of a point to which DCM is applied. In other words, the DCM order information may be configured to include information related to an output order of a decoding result in an intermediate level of the Octree. The DCM order information generating portion 123 supplies the generated DCM order information to the DCM order information coding portion 124.

The DCM order information coding portion 124 performs processing related to coding of DCM order information. For example, the DCM order information coding portion 124 acquires DCM order information supplied from the DCM order information generating portion 123. The DCM order information coding portion 124 encodes the acquired DCM order information and generates coded data. A method of the coding is arbitrary. The DCM order information coding portion 124 supplies the generated coded data of the DCM order information to the bitstream generating portion 105 (FIG. 6).

The recolor processing portion 125 performs processing related to processing (recolor processing) for matching attribute data to geometry data. For example, the recolor processing portion 125 acquires attribute data of a point cloud that is input to the coding apparatus 100. In addition, the recolor processing portion 125 acquires geometry data of each point having been sorted in the Morton order which is supplied from the sorting portion 122.

The recolor processing portion 125 performs processing (recolor processing) for matching the acquired attribute data to the acquired geometry data and generates point cloud data. The recolor processing portion 125 supplies the generated point cloud data to the attribute information coding portion 104 (FIG. 6).

By adopting the configuration described above, the point cloud generating portion 103 can generate DCM order information and transmit the DCM order information to a decoding side. Due to the DCM order information, even a decoding result of a point having been encoded by applying DCM can be output in an appropriate output order. Therefore, since sorting of points is no longer necessary during decoding, the coding apparatus 100 can suppress an increase in implementation cost in order to reliably realize real-time processing of decoding coded data of a point cloud.

It should be noted that the processing portions (the Morton code transforming portion 121 to the recolor processing portion 125) of the point cloud generating portion 103 respectively have arbitrary configurations. For example, each processing portion may be constituted of a logic circuit which realizes the processing described above. In addition, each processing portion may have a CPU, a ROM, a RAM, or the like and may realize the processing described above by executing a program using the CPU, the ROM, the RAM, or the like. It is needless to say that each processing portion may have both configurations and may realize a part of the processing described above by a logic circuit and realize another part of the processing described above by executing a program. Alternatively, configurations of the respective processing portions may be independent of each other and, for example, a part of the processing portions may realize a part of the processing described above by a logic circuit, another part of the processing portions may realize the processing described above by executing a program, and yet other processing portions may realize the processing described above by both using a logic circuit and executing a program.

<Flow of Coding Processing>

Next, processing to be executed by the coding apparatus 100 will be described. The coding apparatus 100 encodes data of a point cloud by executing coding processing. An example of a flow of the coding processing will now be described with reference to the flow chart shown in FIG. 9.

Once the coding processing is started, in step S101, the positional information coding portion 101 of the coding apparatus 100 encodes geometry data (positional information) of an input point cloud and generates coded data of the geometry data. In doing so, the positional information coding portion 101 performs processing by applying the present technique described above in <1. Guarantee of output order of decoding result>. Details of positional information coding processing will be provided later.

In step S102, the positional information decoding portion 102 decodes the coded data of geometry data generated in step S101 and generates positional information.

In step S103, the point cloud generating portion 103 performs recolor processing using attribute data (attribute information) of the input point cloud and the geometry data (the decoding result) generated in step S102 and generates point cloud data by associating the attribute data with the geometry data. In addition, in doing so, the point cloud generating portion 103 applies the present technique described above in <1. Guarantee of output order of decoding result> to perform processing for generating DCM order information indicating an output order of a decoding result of a point to which DCM is applied and encoding the DCM order information. Details of the point cloud generation processing will be described later.

In step S104, the attribute information coding portion 104 executes attribute information coding processing to encode the attribute data having been subjected to recolor processing in step S103 and generates coded data of the attribute data.

In step S105, the bitstream generating portion 105 generates a bitstream including the coded data of the geometry data generated in step S101, the coded data of the DCM order information generated in step S103, and the coded data of the attribute data generated in step S104, and outputs the generated bitstream.

The coding processing ends when the processing of step S105 ends.

By performing processing of each step as described above, since the coding apparatus 100 no longer needs to perform sorting processing of points during decoding, an increase in a load of decoding processing of coded data of a point cloud can be suppressed. Therefore, the coding apparatus 100 can suppress an increase in implementation cost in order to reliably realize real-time processing of decoding coded data of a point cloud.

<Flow of Positional Information Coding Processing>

Next, an example of a flow of positional information coding processing that is executed in step S101 in FIG. 9 will be described with reference to the flow chart in FIG. 10.

Once positional information coding processing is started, in step S121, the bounding box setting portion 111 sets a bounding box with respect to geometry data that is a processing object.

In step S122, the voxel setting portion 112 sets voxels based on the bounding box set in step S121 and quantizes geometry data of each point.

In step S123, the mode selecting portion 113 selects voxel data to be a processing object in accordance with a Morton order from voxels set in step S122.

In step S124, the mode selecting portion 113 determines whether or not DCM is to be applied to the processing object voxel data. When a determination of sparse is made based on predetermined conditions, the processing advances to step S125.

In step S125, the DCM coding portion 115 subjects the processing object voxel data to DCM coding. Once the processing of step S125 ends, the processing advances to step S127.

Alternatively, when it is determined in step S124 that DCM is not to be applied to the processing object voxel data, the processing advances to step S126.

In step S126, the Octree coding portion 114 applies the present technique described above in <1. Guarantee of output order of decoding result> to perform Octree coding with respect to the processing object voxel data so that an output order of a decoding result is a Morton order. Once the processing of step S126 ends, the processing advances to step S127.

In step S127, the mode selecting portion 113 determines whether or not all pieces of voxel data have been processed. When there is voxel data yet to be processed, the processing returns to step S123 and repeats subsequent processing. In other words, each processing step of steps S123 to S127 is executed with respect to each piece of voxel data.

Subsequently, when it is determined in step S127 that all of the pieces of voxel data have been processed, the positional information coding processing ends and processing returns to FIG. 9.

By performing processing of each step as described above, since the coding apparatus 100 no longer needs to perform sorting processing of points during decoding, an increase in a load of decoding processing of coded data of a point cloud can be suppressed. Therefore, the coding apparatus 100 can suppress an increase in implementation cost in order to reliably realize real-time processing of decoding coded data of a point cloud.

<Flow of Point Cloud Generation Processing>

Figure 11:
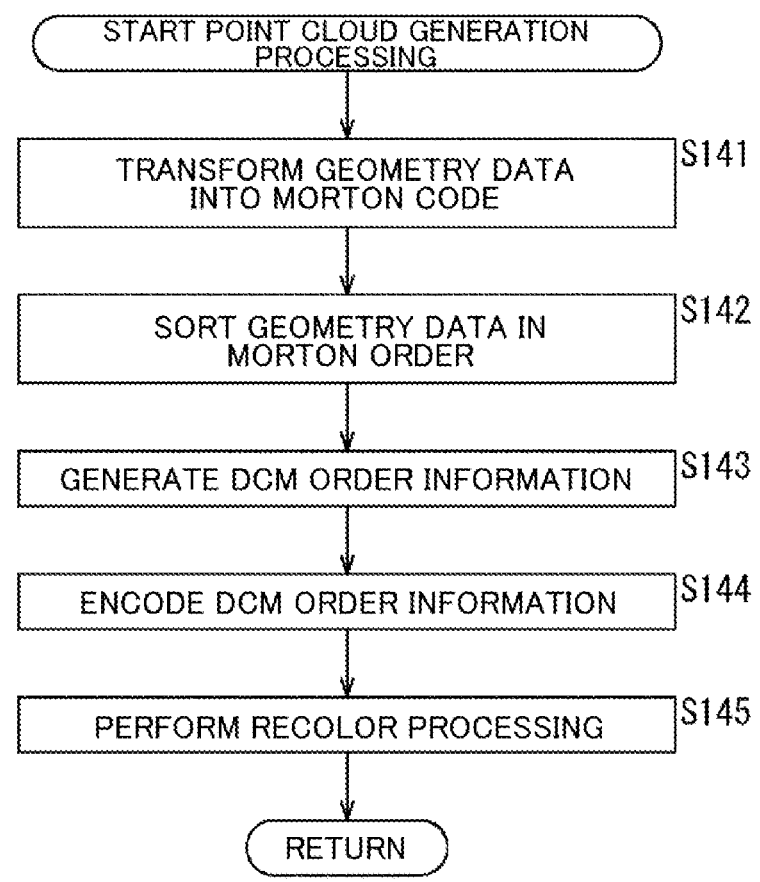
FIG. 11 is a flow chart for explaining an example of a flow of point cloud generation processing.

Next, an example of a flow of point cloud generation processing that is executed in step S103 in FIG. 9 will be described with reference to the flow chart in FIG. 11.

Once point cloud generation processing starts, in step S141, the Morton code transforming portion 121 (FIG. 8) of the point cloud generating portion 103 transforms geometry data into a Morton code.

In step S142, the sorting portion 122 sorts geometry data in a Morton order based on the Morton code added in step S121.

In step S143, the DCM order information generating portion 123 specifies a point to which DCM is applied during coding among geometry data of each point having been sorted in a Morton order and generates DCM order information indicating an output order of a decoding result of the point. In doing so, the DCM order information generating portion 123 generates the DCM order information by applying the present technique described above in <1. Guarantee of output order of decoding result>.

In step S144, the DCM order information coding portion 124 encodes the DCM order information generated in step S143 and generates coded data.

In step S145, the recolor processing portion 125 performs processing (recolor processing) for matching the acquired attribute data to the acquired geometry data and generates point cloud data.

Figure 9:
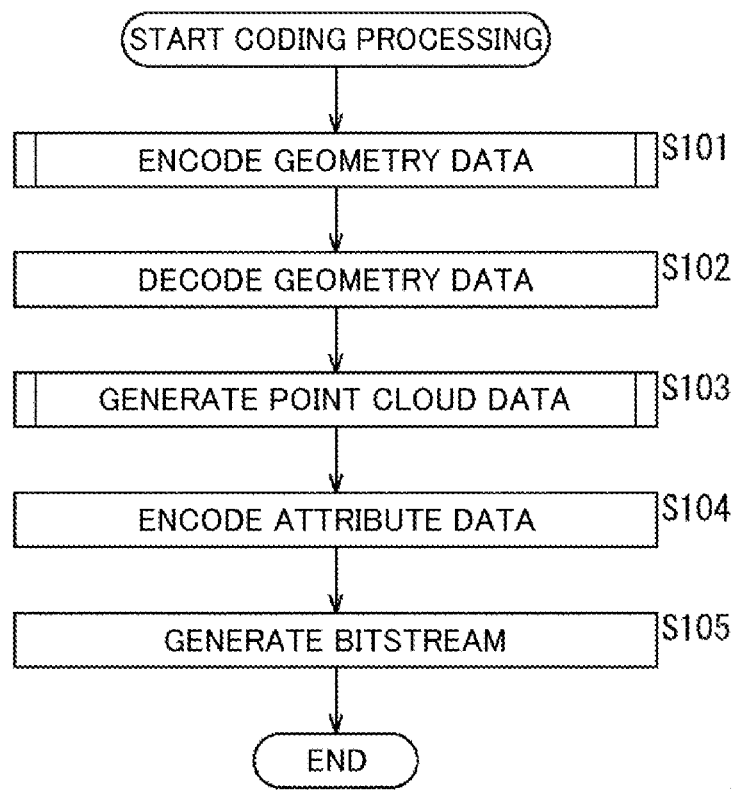
FIG. 9 is a flow chart for explaining an example of a flow of coding processing.
Figure 10:
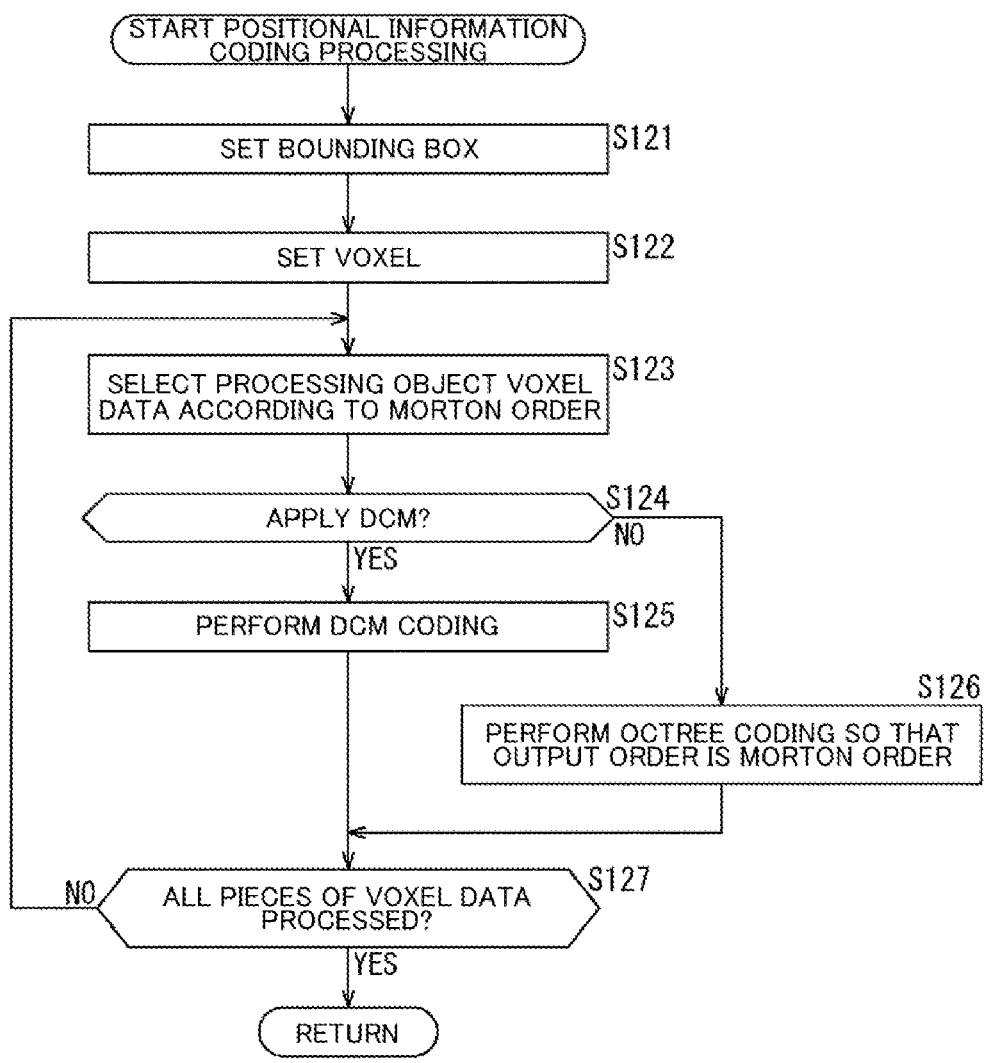
FIG. 10 is a flow chart for explaining an example of a flow of positional information coding processing.

Once the processing of step S145 ends, the point cloud generation processing ends and processing returns to FIG. 9.

By performing processing of each step as described above, since the coding apparatus 100 no longer needs to perform sorting processing of points during decoding, an increase in a load of decoding processing of coded data of a point cloud can be suppressed. Therefore, the coding apparatus 100 can suppress an increase in implementation cost in order to reliably realize real-time processing of decoding coded data of a point cloud.

3. Second Embodiment

<Decoding Apparatus>

Figure 12:
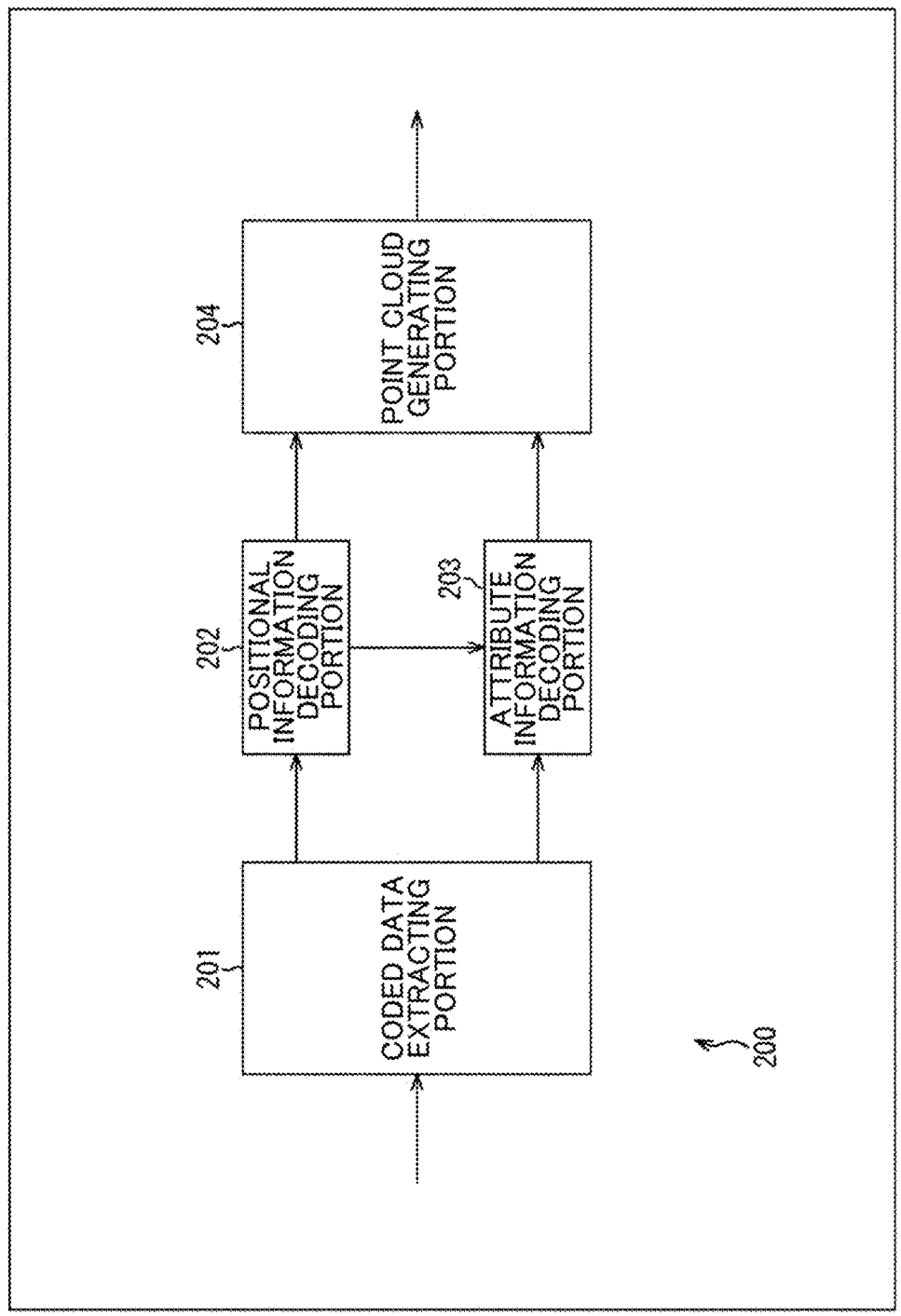
FIG. 12 is a block diagram showing a main configuration example of a decoding apparatus.

Next, another example of an apparatus to which the present technique described above in <1. Guarantee of output order of decoding result> is applied will be explained. FIG. 12 is a block diagram showing an example of a configuration of a decoding apparatus that represents an aspect of the information processing apparatus to which the present technique is applied. A decoding apparatus 200 shown in FIG. 12 is an apparatus which decodes coded data of a point cloud (3D data). The decoding apparatus 200 decodes coded data of a point cloud by applying the present technique described above in <1. Guarantee of output order of decoding result>.

It should be noted that FIG. 12 shows main processing portions, main flows of data, and the like and that those shown in FIG. 12 do not represent all processing portions, all flows of data, and the like. In other words, in the decoding apparatus 200, there may be processing portions not shown as a block in FIG. 12 and flows of processing or data not depicted by an arrow in FIG. 12.

As shown in FIG. 12, the decoding apparatus 200 includes a coded data extracting portion 201, a positional information decoding portion 202, an attribute information decoding portion 203, and a point cloud generating portion 204.

The coded data extracting portion 201 acquires a bitstream input to the decoding apparatus 200 and retains the bitstream. The coded data extracting portion 201 extracts coded data of geometry data (positional information) and attribute data (attribute information) from the bitstream. In doing so, the coded data extracting portion 201 can extract coded data of all levels from the bitstream. Alternatively, for example, coded data from an uppermost layer to a level designated by a user, an application, or the like (in other words, coded data of a part of the levels) can also be extracted from the bitstream.

The coded data extracting portion 201 supplies the extracted coded data of the geometry data to the positional information decoding portion 202. The coded data extracting portion 201 supplies the extracted coded data of the attribute data to the attribute information decoding portion 203.

The positional information decoding portion 202 acquires coded data of the geometry data supplied from the coded data extracting portion 201. The positional information decoding portion 202 decodes the coded data of the geometry data and generates geometry data (a decoding result). In doing so, the positional information decoding portion 202 decodes the geometry data by applying the present technique described above in <1. Guarantee of output order of decoding result>. In other words, the positional information decoding portion 202 decodes the coded data of the geometry data and outputs a decoding result thereof in a processing order of the attribute data of the point cloud.

The positional information decoding portion 202 supplies the generated geometry data (the decoding result) to the attribute information decoding portion 203 and the point cloud generating portion 204.

The attribute information decoding portion 203 acquires coded data of the attribute data supplied from the coded data extracting portion 201. The attribute information decoding portion 203 acquires the geometry data (the decoding result) supplied from the positional information decoding portion 202. Using the geometry data, the attribute information decoding portion 203 decodes the coded data of the attribute data and generates attribute data (a decoding result). The attribute information decoding portion 203 supplies the generated attribute data (the decoding result) to the point cloud generating portion 204.

The point cloud generating portion 204 acquires the geometry data (the decoding result) supplied from the positional information decoding portion 202. The point cloud generating portion 204 acquires the attribute data (the decoding result) supplied from the attribute information decoding portion 203. The point cloud generating portion 204 generates a point cloud (a decoding result) using the geometry data (the decoding result) and the attribute data (the decoding result). The point cloud generating portion 204 outputs data of the generated point cloud (the decoding result) to outside of the decoding apparatus 200.

By adopting such a configuration, since geometry data of a decoding result is be output in a same order as the processing order of attribute data, sorting processing of points need no longer be performed. Therefore, the decoding apparatus 200 is capable of suppressing an increase in a load of decoding processing of coded data of a point cloud.

Therefore, an increase in implementation cost in order to reliably realize real-time processing of decoding coded data of a point cloud can be suppressed.

It should be noted that the processing portions (the coded data extracting portion 201 to the point cloud generating portion 204) described above respectively have arbitrary configurations. For example, each processing portion may be constituted of a logic circuit which realizes the processing described above. In addition, each processing portion may have a CPU, a ROM, a RAM, or the like and may realize the processing described above by executing a program using the CPU, the ROM, the RAM, or the like. It is needless to say that each processing portion may have both configurations and may realize a part of the processing described above by a logic circuit and realize another part of the processing described above by executing a program. Alternatively, configurations of the respective processing portions may be independent of each other and, for example, a part of the processing portions may realize a part of the processing described above by a logic circuit, another part of the processing portions may realize the processing described above by executing a program, and yet other processing portions may realize the processing described above by both using a logic circuit and executing a program.

<Positional Information Decoding Portion>

Figure 13:
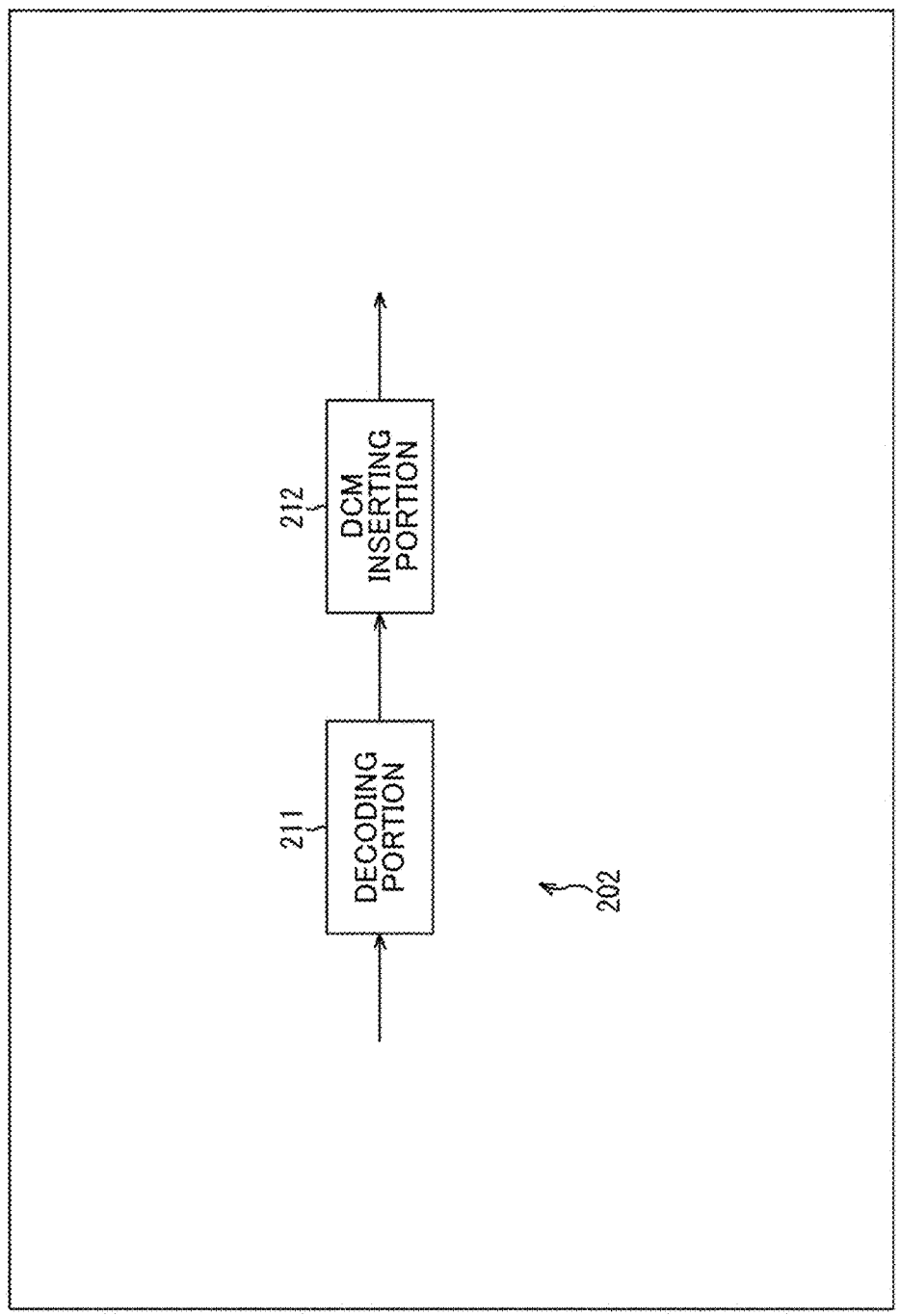
FIG. 13 is a block diagram showing a main configuration example of a positional information decoding portion.

FIG. 13 is a block diagram showing a main configuration example of the positional information decoding portion 202 (FIG. 12). It should be noted that FIG. 13 shows main processing portions, main flows of data, and the like and that those shown in FIG. 13 do not represent all processing portions, all flows of data, and the like. In other words, in the positional information decoding portion 202, there may be processing portions not shown as a block in FIG. 13 and flows of processing or data not depicted by an arrow in FIG. 13.

The positional information decoding portion 202 shown in FIG. 13 has a decoding portion 211 and a DCM inserting portion 212.

The decoding portion 211 performs processing related to decoding of geometry data. For example, the positional information decoding portion 202 acquires coded data of the geometry data supplied from the coded data extracting portion 201. The decoding portion 211 decodes the acquired coded data and generates (restores) geometry data.

For example, the decoding portion 211 decodes coded data of DCM order information included in the coded data of geometry data. In addition, for example, the decoding portion 211 decodes coded data of Octree data into a Morton order. Furthermore, for example, the decoding portion 211 decodes coded data having been subjected to DCM coding. The decoding portion 211 supplies geometry data generated by decoding (which may include DCM order information, Octree data, geometry data of points to which DCM has been applied (also referred to as DCM data), and the like) to the DCM inserting portion 212.

The DCM inserting portion 212 performs processing related to control of an output order of geometry data of a point to which DCM has been applied. For example, the DCM inserting portion 212 acquires geometry data (which may include DCM order information, Octree data, and DCM data) supplied from the decoding portion 211.

The DCM inserting portion 212 inserts acquired DCM data into a position of an output order indicated by the DCM order information of a sequence of Octree data having been sorted in a Morton order. In other words, the DCM inserting portion 212 performs control so that DCM data is output in an output order indicated by DCM order information corresponding to the DCM data.

The DCM inserting portion 212 supplies Octree data to which DCM data has been inserted (geometry data sorted in a Morton order) to the point cloud generating portion 204 (FIG. 12).

By adopting such a configuration, since geometry data of a decoding result is be output in a same order as the processing order of attribute data, sorting processing of points need no longer be performed. Therefore, the decoding apparatus 200 is capable of suppressing an increase in a load of decoding processing of coded data of a point cloud. Therefore, an increase in implementation cost in order to reliably realize real-time processing of decoding coded data of a point cloud can be suppressed.

It should be noted that the processing portions (the decoding portion 211 and the DCM inserting portion 212) described above have arbitrary configurations. For example, each processing portion may be constituted of a logic circuit which realizes the processing described above. In addition, each processing portion may have a CPU, a ROM, a RAM, or the like and may realize the processing described above by executing a program using the CPU, the ROM, the RAM, or the like. It is needless to say that each processing portion may have both configurations and may realize a part of the processing described above by a logic circuit and realize another part of the processing described above by executing a program. Alternatively, configurations of the respective processing portions may be independent of each other and, for example, a part of the processing portions may realize a part of the processing described above by a logic circuit, another part of the processing portions may realize the processing described above by executing a program, and yet other processing portions may realize the processing described above by both using a logic circuit and executing a program.

<Flow of Decoding Processing>

Next, processing to be executed by the decoding apparatus 200 will be described. The decoding apparatus 200 decodes coded data of a point cloud by executing decoding processing. An example of a flow of the decoding processing will now be described with reference to the flow chart shown in FIG. 14.

Once the decoding processing is started, in step S201, the coded data extracting portion 201 of the decoding apparatus 200 acquires and retains a bitstream and extracts coded data of geometry data (positional information) and attribute data (attribute information) of a level to be decoded from the bitstream.

In step S202, the positional information decoding portion 202 decodes the coded data of geometry data extracted in step S201 and generates geometry data (a decoding result). In doing so, the positional information decoding portion 202 performs processing by applying the present technique described above in <1. Guarantee of output order of decoding result>. Details of positional information decoding processing will be provided later.

In step S203, the attribute information decoding portion 203 decodes the coded data of attribute data extracted in step S201 and generates attribute data (a decoding result).

In step S204, the point cloud generating portion 204 generates point cloud data (a decoding result) using the geometry data (the decoding result) generated in step S202 and the attribute data (the decoding result) generated in step S203, and outputs the generated point cloud data (the decoding result).

The decoding processing ends when the processing of step S204 ends.

Since performing processing of each step in this manner causes geometry data of a decoding result to be output in a same order as the processing order of attribute data, sorting processing of points need no longer be performed. Therefore, the decoding apparatus 200 is capable of suppressing an increase in a load of decoding processing of coded data of a point cloud. Therefore, an increase in implementation cost in order to reliably realize real-time processing of decoding coded data of a point cloud can be suppressed.

<Flow of Positional Information Decoding Processing>

Next, an example of a flow of positional information decoding processing that is executed in step S202 in FIG. 14 will be described with reference to the flow chart in FIG. 15.

Once the positional information decoding processing is started, in step S221, the decoding portion 211 of the positional information decoding portion 202 decodes DCM order information.

In step S222, the decoding portion 211 decodes coded data of Octree data into a Morton order.

In step S223, the decoding portion 211 decodes coded data of DCM data.

In step S224, the DCM inserting portion 212 inserts DCM data decoded in step S223 into a position corresponding to an output order indicated by the DCM order information decoded in step S221 of the Octree data which is arranged in the Morton order and which has been decoded in step S222. In other words, the DCM inserting portion 212 performs control of an output order of the geometry data (the decoding result) so that DCM data is output in an output order indicated by DCM order information. In doing so, the DCM inserting portion 212 performs processing by applying the present technique described above in <1. Guarantee of output order of decoding result>.

Once the processing of step S224 ends, the positional information decoding processing ends and the processing returns to FIG. 14.

Since performing processing of each step in this manner causes geometry data of a decoding result to be output in a same order as the processing order of attribute data, sorting processing of points need no longer be performed. Therefore, the decoding apparatus 200 is capable of suppressing an increase in a load of decoding processing of coded data of a point cloud. Therefore, an increase in implementation cost in order to reliably realize real-time processing of decoding coded data of a point cloud can be suppressed.

4. Appendix

<Other Output Orders>

While a description of outputting a decoding result of geometry data in a processing order of attribute data has been given above, the output order of the decoding result of geometry data need only be a known order and is not limited to the example described above. As long as the output order is known, processing suited to the output order can be performed in a subsequent stage and sorting of points may become unnecessary.

For example, when attribute data is not decoded, the output order of a decoding result of geometry data may be an order other than the processing order of attribute data.

Figure 16:
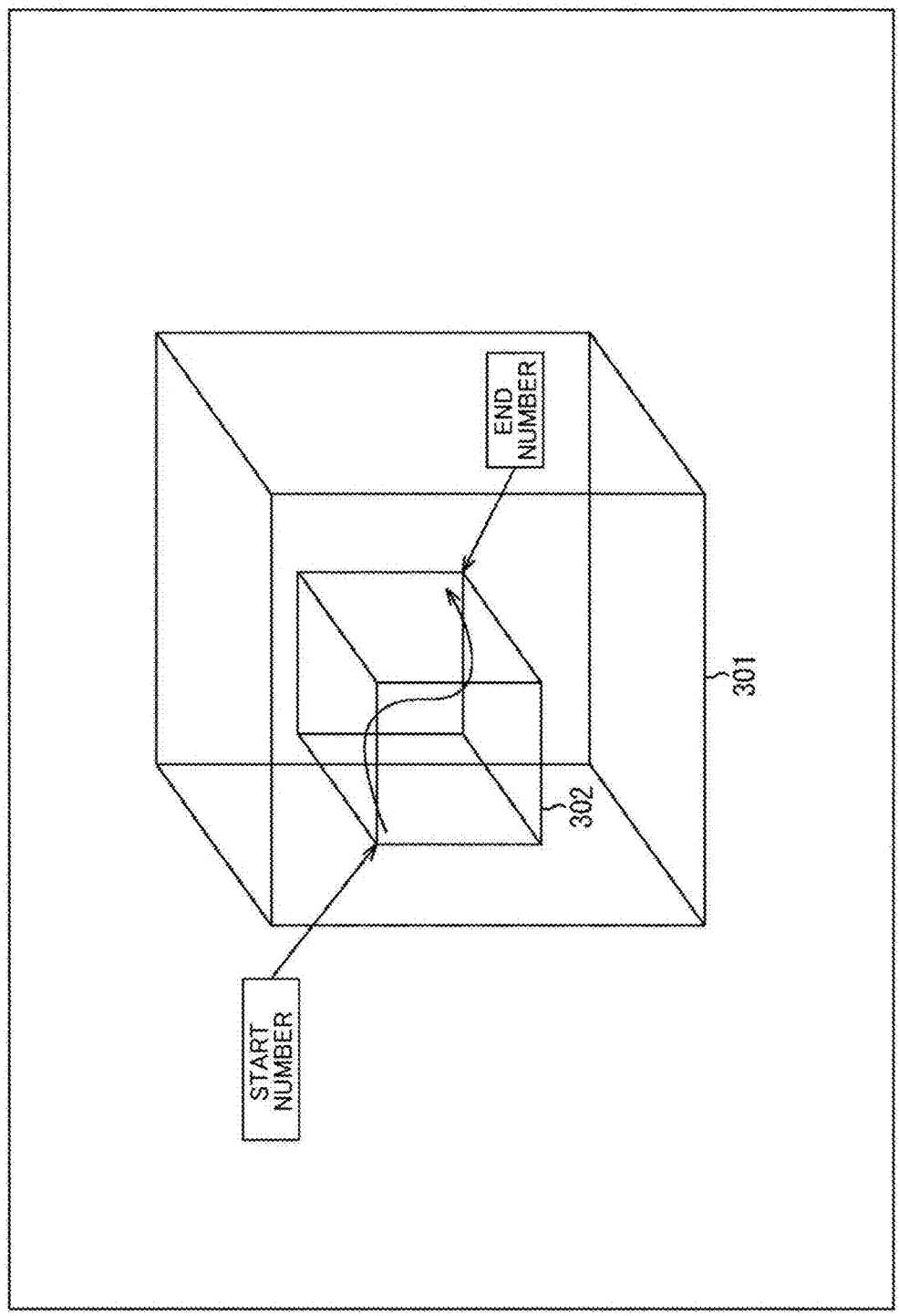
FIG. 16 is a diagram for explaining an example of a state where a local region is being decoded.

As in the example shown in FIG. 16, when decoding geometry data of a partial region 302 that is a three-dimensional region constituting a part of a bounding box 301 enclosing an object, if a decoding result of the geometry data is output in a Morton order, the geometry data included in the partial region 302 can be designated as a group of data. In other words, by simply specifying a first point (a start number) and a last point (an end number) as decoding objects, only geometry data within the partial region 302 can be readily decoded.

In this manner, by performing coding or decoding by applying the present technique described above in <1. Guarantee of output order of decoding result> and causing a decoding result of geometry data to be output in a predetermined order, the need to perform sorting processing of points may be eliminated. Therefore, in such a case, an increase in a load of decoding processing of coded data of a point cloud can be suppressed. Therefore, an increase in implementation cost in order to reliably realize real-time processing of decoding coded data of a point cloud can be suppressed.

<Control Information>

While signaling of control information has been described above, alternatively, control information other than the example described above may be signaled. For example, control information (for example, an enabled_flag) for controlling whether or not application of the present technique described above is to be permitted (or prohibited) may be transmitted. In addition, for example, control information for designating a range (for example, an upper limit, a lower limit, or both upper and lower limits of a block size, a slice, a picture, a sequence, a component, a view, or a layer) in which application of the present technique described above is to be permitted (or prohibited) may be transmitted.

<Computer>

The series of processing described above can be executed by hardware or by software. When the series of processing is to be executed by software, a program constituting the software is installed in a computer. Examples of the computer in this case include a computer that is built into dedicated hardware and a general-purpose personal computer or the like capable of executing various functions when various programs are installed therein.

Figure 17:
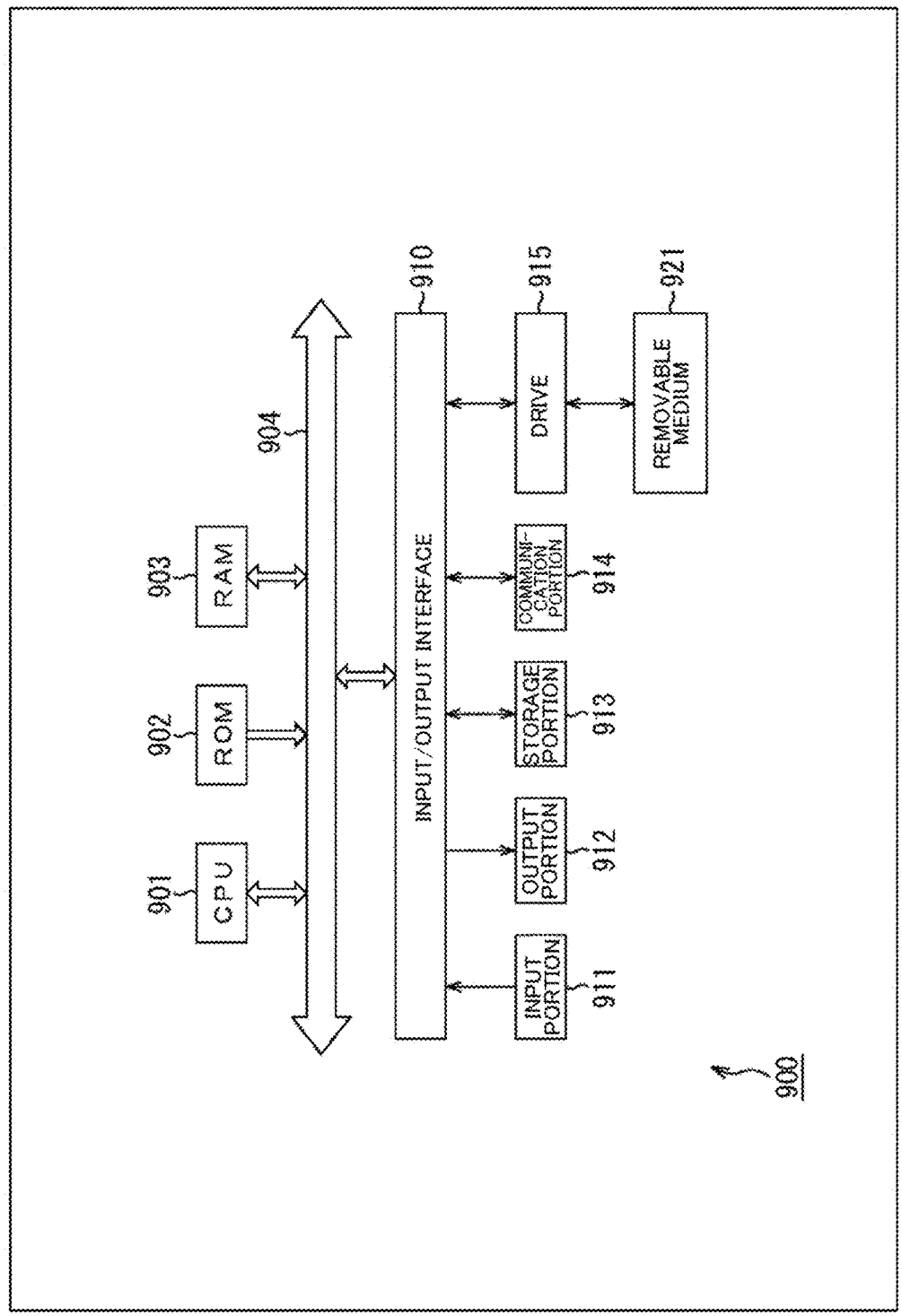
FIG. 17 is a block diagram showing a main configuration example of a computer.

FIG. 17 is a block diagram showing a configuration example of hardware of a computer that executes the series of processing described above in accordance with a program.

In a computer 900 shown in FIG. 17, a CPU (Central Processing Unit) 901, a ROM (Read Only Memory) 902, and a RAM (Random Access Memory) 903 are connected to each other via a bus 904.

An input/output interface 910 is also connected to the bus 904. An input portion 911, an output portion 912, a storage portion 913, a communication portion 914, and a drive 915 are connected to the input/output interface 910.

For example, the input portion 911 is constituted of a keyboard, a mouse, a microphone, a touch panel, an input terminal, or the like. For example, the output portion 912 is constituted of a display, a speaker, an output terminal, or the like. For example, the storage portion 913 is constituted of a hard disk, a RAM disk, a non-volatile memory, or the like. For example, the communication portion 914 is constituted of a network interface or the like. The drive 915 drives a removable medium 921 that is a magnetic disk, an optical disk, a magneto optical disk, a semiconductor memory, or the like.

In the computer configured as described above, the series of processing described earlier is performed as the CPU 901 loads a program stored in the storage portion 913 onto the RAM 903 via the input/output interface 910 and the bus 904 and executes the program. Data required by the CPU 901 to execute the various types of processing is also stored in the RAM 903 when appropriate.

For example, the program executed by the computer can be applied by being recorded on the removable medium 921 as a packaged medium or the like. In such a case, the program can be installed in the storage portion 913 via the input/output interface 910 by mounting the removable medium 921 to the drive 915.

In addition, the program can also be provided via a wired or wireless transmission medium such as a local area network, the Internet, or digital satellite broadcast. In such a case, the program can be received by the communication portion 914 and installed in the storage portion 913.

Alternatively, the program can be installed in the ROM 902 or the storage portion 913 in advance.

<Application Object of Present Technique>

While cases where the present technique is applied to coding and decoding of point cloud data have been described above, the present technique is not limited to these examples and can be applied to coding and decoding of 3D data of any standard. In other words, as long as there are no discrepancies with the present technique described above, various types of processing such as coding and decoding methods and specifications of various types of data such as 3D data and metadata are arbitrary. In addition, as long as there are no discrepancies with the present technique, a part of processing and specifications described above may be omitted.

In addition, while the coding apparatus 100 and the decoding apparatus 200 have been described above as application examples of the present technique, the present technique can be applied to any configuration.

For example, the present technique may be applied to various electronic devices including a transmitter or a receiver in satellite broadcast, wired broadcast such as cable TV, broadcast on the Internet, and broadcast to terminals by cellular telecommunications (for example, a television receiver or a mobile phone) and an apparatus for recording an image on a medium such as an optical disk, a magnetic disk, or a flash memory and reproducing an image from such storage medium (for example, a hard disk recorder or a camera).

In addition, for example, the present technique can also be implemented as a partial component of an apparatus such as a processor as a system LSI (Large Scale Integration) (for example, a video processor), a module which uses a plurality of processors (for example, a video module), a unit which uses a plurality of modules (for example, a video unit), or a set created by adding other functions to a unit (for example, a video set).

In addition, for example, the present technique can also be applied to a network system constituted of a plurality of apparatuses. For example, the present technique may be implemented as cloud computing in which processing is shared among and cooperatively performed by a plurality of apparatuses via a network. For example, the present technique may be implemented in a cloud service which provides a service related to images (moving images) with respect to an arbitrary terminal such as a computer, an AV (Audio Visual) device, a mobile information processing terminal, or an IoT (Internet of Things) device.

It should be noted that, in the present specification, a system signifies a set of a plurality of components (apparatuses, modules (parts), and the like), and whether or not all of the components are present inside a same casing does not matter. Therefore, a plurality of apparatuses which are housed in separate casings but which are connected to each other via a network and a single apparatus in which a plurality of modules are housed in a single casing are both considered systems.

<Fields and Use Application to which Present Technique is Applicable>

A system, an apparatus, a processing portion, or the like to which the present technique is applied can be used in any field such as transport, medical, security, agriculture, husbandry, mining, beauty care, factory, home electrical appliances, weather, and natural monitoring. In addition, use applications are also arbitrary.

<Other>

In the present specification, a "flag" refers to information for identifying a plurality of states and includes, in addition to information used when identifying two states of true (1) and false (0), information that enables three or more states to be identified. Therefore, for example, values that can be assumed by the "flag" may be the two values of I/O or three or more values. In other words, the number of bits constituting the "flag" is arbitrary and may be one bit or a plurality of bits. In addition, since identification information (including flags) is envisaged in a form in which difference information of the identification information relative to some kind of reference information is included in a bitstream in addition to a form in which the identification information is included in a bitstream, in the present specification, a "flag" and "identification information" are to include not only the information itself but also difference information relative to reference information.

In addition, various types of information (such as metadata) related to coded data (a bitstream) may be transmitted or recorded in any form as long as the information is associated with the coded data. In this case, the term "associate" means, for example, enabling another piece of data to be used (to be linked) when processing one piece of data. In other words, pieces of data that are associated with each other may be unified into one piece of data or may each be handled as an individual piece of data. For example, information associated with coded data (an image) may be transmitted along a different transmission path to the coded data (the image). In addition, for example, information associated with coded data (an image) may be recorded in a different recording medium (or a different recording area in a same recording medium) from the coded data (the image). It should be noted that the "association" may apply to a part of the data instead of all of the data. For example, an image and information corresponding to the image may be associated with each other in an arbitrary unit such as a plurality of frames, a single frame, or a part of the frame.

In the present specification, terms such as "composite", "multiplex", "add", "integrate", "include", "store", "contain", "introduce", and "insert" mean unifying a plurality of things into one such as unifying coded data and metadata into one piece of data and signify one method of "association" described above.

In addition, embodiments of the present technique are not limited to the embodiment described above and various modifications can be made without departing from the gist of the present technique.

For example, a configuration described as one apparatus (or processing portion) may be divided and configured as a plurality of apparatuses (or processing portions). Conversely, a configuration described above as a plurality of apparatuses (or processing portions) may be unified and configured as one apparatus (or processing portion). In addition, a configuration other than those described above can also be added to the configuration of each apparatus (or each processing portion). Furthermore, as long as a configuration or an operation of a system as a whole is substantially the same, a part of a configuration of a given apparatus (or a processing portion) may be included in a configuration of another apparatus (or a processing portion).

In addition, for example, the program described above may be configured to be executed by an arbitrary apparatus. In such a case, the apparatus need only be configured to include necessary functions (such as function blocks) and to be capable of obtaining necessary information.

In addition, for example, each step of one flow chart may be executed by a single apparatus or executed in a shared manner by a plurality of apparatuses. Furthermore, when a single step includes a plurality of processing steps, the plurality of processing steps may be executed by a single apparatus or executed in a shared manner by a plurality of apparatuses. In other words, the plurality of processing steps included in a single step can be executed as processing of a plurality of steps. Conversely, processing described as being a plurality of steps can also be collectively executed as a single step.

In addition, for example, of the program to be executed by the computer, processing of steps describing the program may be time-sequentially executed along an order described in the present specification or executed in parallel or at necessary timings such as when a call or the like is made. In other words, as long as no discrepancies arise, processing of each step may be executed in an order that differs from the order described above. Furthermore, processing of steps describing the program may be executed in parallel with processing of another program or executed in combination with the processing of another program.

In addition, for example, each of the plurality of techniques related to the present technique can be performed independently of each other as long as no discrepancies arise. Obviously, any number of the plurality of present techniques can be performed in a combined manner. For example, a part of or all of the present techniques described in any of the embodiments may be performed in combination with a part of or all of the present techniques described in another embodiment. Furthermore, a part of or all of any of the present techniques described above can be performed in combination with another technique not described above.

The present techniques can also be configured as follows.

(1) An information processing apparatus, including:
a coding portion configured to encode positional information of a point cloud expressing an object with a three-dimensional shape as a set of points in an order which causes a decoding result of coded data of the positional information to be output in a processing order of attribute information of the point cloud and to generate the coded data.

(2) The information processing apparatus according to (1), wherein
the coding portion is configured to encode the positional information in an order that causes the decoding result to be output in a Morton order and to generate the coded data.

(3) The information processing apparatus according to (1) or (2), wherein
the coding portion is configured to encode the positional information having been arranged in a tree structure in an order that causes the decoding result to be output in a processing order of attribute information of the point cloud at each node of the tree structure and to generate the coded data.

(4) The information processing apparatus according to (3), wherein
the tree structure is an Octree.

(5) The information processing apparatus according to (4), further including:
a DCM coding portion configured to encode the positional information of a sparse point of the Octree by applying DCM (Direct Coding Mode) and to generate coded data of the positional information; and
a generating portion configured to generate control information related to an output order of a decoding result of the coded data generated by the DCM coding portion.

(6) The information processing apparatus according to (5), wherein
the control information includes information indicating an output order of the decoding result by an order from the top.

(7) The information processing apparatus according to (5), wherein
the control information includes information indicating an output order of the decoding result by a difference value from an output order of a decoding result of coded data of the positional information which has been encoded by applying DCM and which is immediately previously output.

(8) The information processing apparatus according to (5), wherein
the control information includes information indicating an output order of the decoding result by a difference value from a predetermined reference order.

(9) The information processing apparatus according to any one of (5) to (8), wherein
the control information also includes information related to an output order of the decoding result in an intermediate level of the tree structure.

(10) An information processing method, including the step of:
coding positional information of a point cloud expressing an object with a three-dimensional shape as a set of points in an order which causes a decoding result of coded data of the positional information to be output in a processing order of attribute information of the point cloud and generating the coded data.

(11) An information processing apparatus, including:
a decoding portion configured to decode coded data of positional information of a point cloud expressing an object with a three-dimensional shape as a set of points and to output a decoding result in a processing order of attribute information of the point cloud.

(12) The information processing apparatus according to (11), wherein
the decoding portion is configured to output the decoding result in a Morton order.

(13) The information processing apparatus according to (11) or (12), wherein
the decoding portion is configured to decode coded data of the positional information having been arranged in a tree structure and to output the decoding result in a processing order of attribute information of the point cloud at each node of the tree structure.

(14) The information processing apparatus according to (13), wherein
the tree structure is an Octree.

(15) The information processing apparatus according to (14), further including:
further including an output control portion configured to cause a decoding result of coded data of the positional information having been encoded by applying DCM (Direct Coding Mode) to be output in an output order indicated by control information related to an output order of a decoding result of the coded data.

(16) The information processing apparatus according to (15), wherein
the control information includes information indicating an output order of the decoding result by an order from the top.

(17) The information processing apparatus according to (15), wherein
the control information includes information indicating an output order of the decoding result by a difference value from an output order of a decoding result of coded data of the positional information which has been encoded by applying DCM and which is immediately previously output.

(18) The information processing apparatus according to (15), wherein
the control information includes information indicating an output order of the decoding result by a difference value from a predetermined reference order.

(19) The information processing apparatus according to any one of (15) to (18), wherein
the control information also includes information related to an output order of the decoding result in an intermediate level of the tree structure.

(20) An information processing method, including the step of:
decoding coded data of positional information of a point cloud expressing an object with a three-dimensional shape as a set of points and outputting a decoding result in a processing order of attribute information of the point cloud.

REFERENCE SIGNS LIST

100 Coding apparatus
101 Positional information coding portion
102 Positional information decoding portion
103 Point cloud generating portion
104 Attribute information coding portion
105 Bitstream generating portion
111 Bounding box setting portion
112 Voxel setting portion
113 Mode selecting portion
114 Octree coding portion
115 DCM coding portion
121 Morton code transforming portion
122 Sorting portion
123 DCM order information generating portion
124 DCM order information coding portion
125 Recolor processing portion
200 Decoding apparatus
201 Coded data extracting portion
202 Positional information decoding portion
203 Attribute information decoding portion
204 Point cloud generating portion
211 Decoding portion
212 DCM inserting portion

The invention claimed is:

1. An information processing apparatus, comprising:
a coding portion configured to encode positional information of a point cloud expressing an object with a three-dimensional shape as a set of points in an order which causes a decoding result of coded data of the positional information to be output in a processing order of attribute information of the point cloud and to generate the coded data.

2. The information processing apparatus according to claim 1, wherein
the coding portion is configured to encode the positional information in an order that causes the decoding result to be output in a Morton order and to generate the coded data.

3. The information processing apparatus according to claim 1, wherein
the coding portion is configured to encode the positional information having been arranged in a tree structure in an order that causes the decoding result to be output in a processing order of attribute information of the point cloud at each node of the tree structure and to generate the coded data.

4. The information processing apparatus according to claim 3, wherein
the tree structure is an Octree.

5. The information processing apparatus according to claim 4, further comprising:
a DCM coding portion configured to encode the positional information of a sparse point of the Octree by applying DCM (Direct Coding Mode) and to generate coded data of the positional information; and
a generating portion configured to generate control information related to an output order of a decoding result of the coded data generated by the DCM coding portion.

6. The information processing apparatus according to claim 5, wherein
the control information includes information indicating an output order of the decoding result by an order from the top.

7. The information processing apparatus according to claim 5, wherein
the control information includes information indicating an output order of the decoding result by a difference value from an output order of a decoding result of coded data of the positional information which has been encoded by applying the DCM and which is immediately previously output.

8. The information processing apparatus according to claim 5, wherein
the control information includes information indicating an output order of the decoding result by a difference value from a predetermined reference order.

9. The information processing apparatus according to claim 5, wherein
the control information also includes information related to an output order of the decoding result in an intermediate level of the tree structure.

10. An information processing method, comprising the step of:
coding positional information of a point cloud expressing an object with a three-dimensional shape as a set of points in an order which causes a decoding result of coded data of the positional information to be output in a processing order of attribute information of the point cloud and generating the coded data.

11. An information processing apparatus, comprising:
a decoding portion configured to decode coded data of positional information of a point cloud expressing an object with a three-dimensional shape as a set of points and to output a decoding result in a processing order of attribute information of the point cloud.

12. The information processing apparatus according to claim 11, wherein
the decoding portion is configured to output the decoding result in a Morton order.

13. The information processing apparatus according to claim 11, wherein
the decoding portion is configured to decode coded data of the positional information having been arranged in a tree structure and to output the decoding result in a processing order of attribute information of the point cloud at each node of the tree structure.

14. The information processing apparatus according to claim 13, wherein
the tree structure is an Octree.

15. The information processing apparatus according to claim 14, further comprising:
further comprising an output control portion configured to cause a decoding result of coded data of the positional information having been encoded by applying DCM (Direct Coding Mode) to be output in an output order indicated by control information related to an output order of a decoding result of the coded data.

16. The information processing apparatus according to claim 15, wherein
the control information includes information indicating an output order of the decoding result by an order from the top.

17. The information processing apparatus according to claim 15, wherein
the control information includes information indicating an output order of the decoding result by a difference value from an output order of a decoding result of coded data of the positional information which has been encoded by applying the DCM and which is immediately previously output.

18. The information processing apparatus according to claim 15, wherein
the control information includes information indicating an output order of the decoding result by a difference value from a predetermined reference order.

19. The information processing apparatus according to claim 15, wherein
the control information also includes information related to an output order of the decoding result in an intermediate level of the tree structure.

20. An information processing method, comprising the step of:
decoding coded data of positional information of a point cloud expressing an object with a three-dimensional shape as a set of points and outputting a decoding result in a processing order of attribute information of the point cloud.

* * * * *